United States Patent [19]
Baker

[11] 3,899,689
[45] *Aug. 12, 1975

[54] ELECTRIC POWER SOURCE

[75] Inventor: Richard H. Baker, Bedford, Mass.

[73] Assignee: Massachusetts Institute of Technology, Cambridge, Mass.

[ * ] Notice: The portion of the term of this patent subsequent to July 24, 1990, has been disclaimed.

[22] Filed: May 15, 1973

[21] Appl. No.: 360,501

Related U.S. Application Data

[63] Continuation-in-part of Ser. No. 256,811, May 25, 1972, Pat. No. 3,748,492.

[52] U.S. Cl. .................. 307/117; 307/279; 321/15
[51] Int. Cl. .......................................... H02m 7/00
[58] Field of Search .......... 307/117, 279, 109, 110, 307/106; 323/21; 321/15

[56] References Cited
UNITED STATES PATENTS
3,524,986  8/1970  Harnden ...................... 323/21 UX

*Primary Examiner*—Robert K. Schaefer
*Assistant Examiner*—M. Ginsburg
*Attorney, Agent, or Firm*—Arthur A. Smith, Jr.; Robert Shaw; Martin M. Santa

[57] ABSTRACT

An electric power source or system for delivering a controllable voltage to a load. It has low power loss and is capable of acting as a programmable source of electric energy, one which can be used, for example, to furnish a very high-voltage output from a lightweight system. The power source is a modular type structure in which the apparatus is made up of a number of identical stages or modules connected in cascade. Each stage includes a voltage supply and floating reference voltages derived from the supply. The voltage supply is connected to the output of the source through bilateral, solid-state switches along alternate electrically conductive paths which connect either one side or the other of the voltage supply to the output. A bistable circuit serves to control the bilateral switches, triggering of the bistable circuit being effected by radiation impinged upon light sensitive devices, the devices being connected to perform a set-reset type function of the circuit. The floating reference voltages provide constant electric potential for switching purposes. The system can be used to step up a voltage; a form thereof can be used to step a voltage down; and the system can be triggered in an avalanche mode.

68 Claims, 28 Drawing Figures

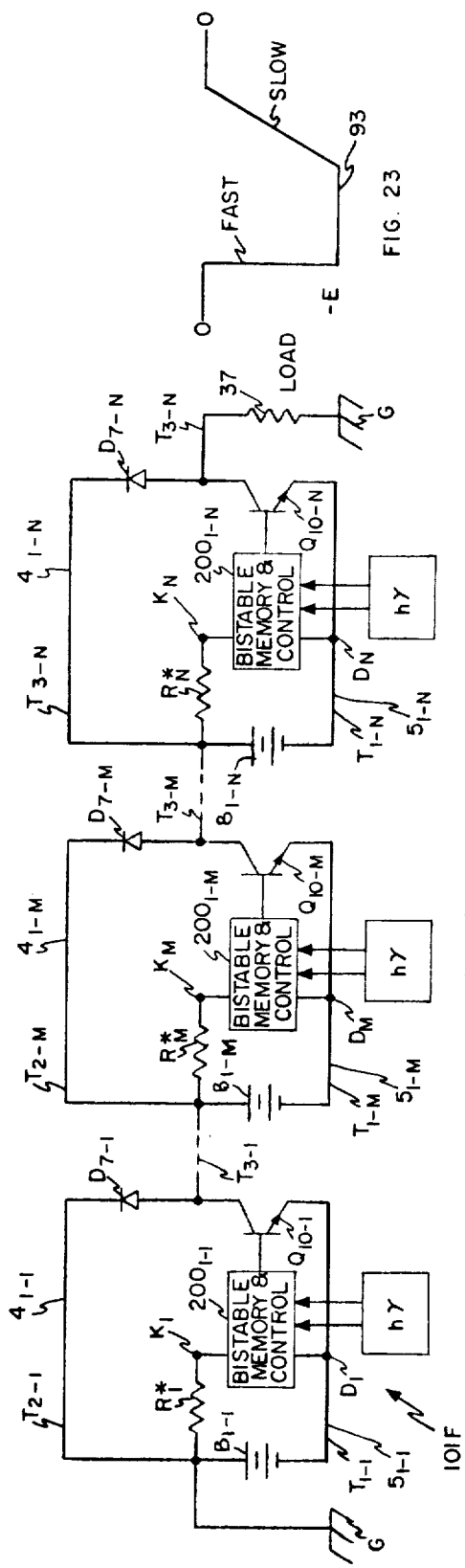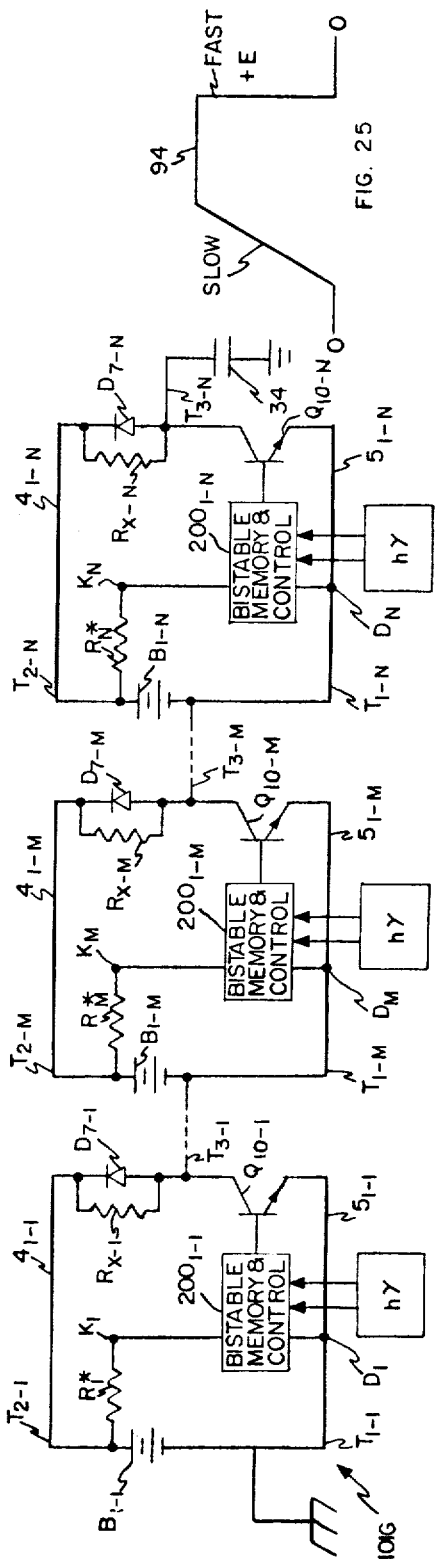
FIG. 23
FIG. 22
FIG. 25
FIG. 24

ELECTRIC POWER SOURCE

The invention described herein was made in the performance of work under NASA contract No. NGL-22-009-01 and is subject to the provisions of Section 305 of the National Aeronautics and Space Act of 1958 (72 Stat. 435; 42 U.S.C. 2457).

This is a continuation-in-part of application S.N. 256,811, filed May 25, 1972 now U.S. Pat. No. 3,748,492 granted July 24, 1973, the complete record of said application being hereby incorporated by reference herein.

The present invention relates to electric power sources or systems with particular emphasis upon electric power systems which can be light actuated to control the output.

Further work has shown that a number of modifications can be made in the circuitry disclosed in said application to improve performance of the power source therein described. For example, the noted ~ 97% efficiency, which is far above efficiencies available from conventional power sources, can be improved upon. Also, the switching times of the parallel-series chain (PSC) making up the power source, can be shortened. Moreover there is scope for improvement in the areas of false switching of the PSC by electrical noise and in providing flexibility in modifying the leading or lagging edge of pulses that are put out by the individual stages of the PSC. Accordingly, it is an object of the present invention to provide novel modifications of the system of said application, to improve said performance and to provide even greater flexibility to the system.

Still further objects are noted hereinafter and are particularly delineated in the appended claims.

The objects of the invention are attained in an electric system that includes a plurality of stages connected in cascade, each stage having supply voltage means connected along two alternate paths to an electric terminal of the stage. Semiconductor switch means, connected between the supply voltage means and the terminal, acts to determine which of the two paths is conductive thereby to determine which side of the supply voltage means is connected to the terminal. A light-actuated bistable memory and control circuit is connected to control the semiconductor switch means, one state of the bistable portion of the circuit acting to render conductive one of said paths and the other state of the bistable portion of the circuit acting to render conductive the other of said paths as alternate conditions of system operation. The system further includes a voltage control section that comprises a plurality of field effect transistors and a voltage coupler connected between the bistable memory and control circuit and the voltage control section. In one form, avalanche triggering, with or without light actuation, is described.

The invention is hereinafter discussed with reference to the accompanying drawing in which:

FIGS. 20, 22, 24 and 26 show schematically modifications of the system of FIG. 1 and FIGS. 21, 23, 25 and 27 show the respective voltage waveform outputs for the systems of these figures.

Figure 2:
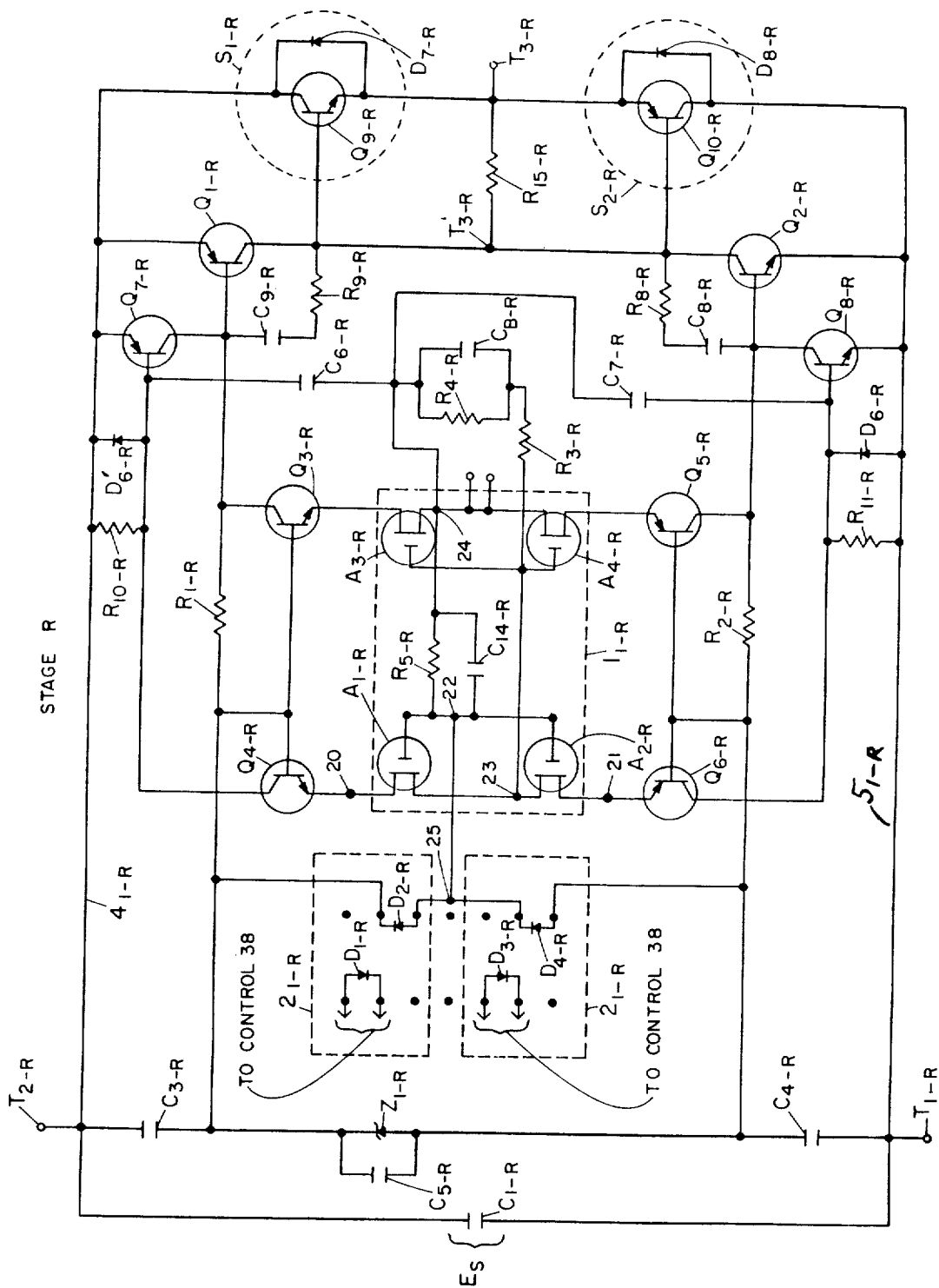
FIG. 2 is a schematic representation showing details of one stage of a low-power loss, light-triggered electric system as described in detail in the parent application said application S.N. 256,811.

In view of the fact that the broad concept of the parallel-series-chain (PSC) type electric power source is described in detail in the parent application, an attempt is made in the present disclosure to repeat only those portions that are essential; it is believed that this can best be accomplished by repeating FIG. 2 which is assigned here the same figure number as in the earlier application.

In FIG. 2, one stage, designated stage R, of a low-power loss, light-triggered electric power source or system is shown. The stage R is FIG. 2 is a three-terminal 5-port (i.e., three electrical ports and two light ports) network. An energy storage element or supply voltage means $C_{1-R}$ is connected along first and second electrical paths $4_{1-R}$ and $5_{1-R}$, respectively, between two input terminals $T_{1-R}$ and $T_{2-R}$ and an output terminal $T_{3-R}$, one side or the other of the element $C_{1-R}$ being connected to the output terminal $T_{3-R}$ depending upon which of switches $S_{1-R}$ and $S_{2-R}$ is closed, i.e., which of the paths is conductive. (Hereinafter the terminals are also referred to as first electrical terminal, second electrical terminal and third electrical terminal, representing the $T_1$, $T_2$ and $T_3$ terminals respectively, the supply voltage means $C_1$ of the stage being connected between the first electrical terminal $T_1$ and the second electrical terminal $T_2$.) The switch position is controlled by buffer amplifiers driven by the bistable circuit labeled $1_{1-R}$. The entire network including the bistable circuit is a low power design and floats without reference to system ground. The switches $S_{1-R}$ and $S_{2-R}$ comprise transistors $Q_{9-R}$ and $Q_{10-R}$, respectively, and diodes $D_{7-R}$ and $D_{8-R}$, respectively. The switches are bilateral in current carrying capability. In other words, current can pass from the terminal $T_{3-R}$ to the terminals $T_{1-R}$ and $T_{2-R}$ through the transistor $Q_{10-R}$ and the diode $D_{7-R}$, respectively, or to the terminal $T_{3-R}$ from the terminals $T_{1-R}$ and $T_{2-R}$ through $D_{8-R}$ and $Q_{9-R}$, respectively. Also, as is explained in the parent application, in some situations the terminals $T_{1-R}$ -$T_{2-R}$ and the terminal $T_{3-R}$ change roles in terms of input and output of the stage, but, generally, in this application the terminal $T_{3-R}$ is considered the output terminal. Briefly now, the transistor $Q_{9-R}$ conducts when a transistor $Q_{1-R}$ conducts and the transistor $Q_{1-R}$ conducts when a transistor $Q_{7-R}$ is OFF; the transistor $Q_{10-R}$ conducts when a transistor $Q_{2-R}$ conducts and the latter conducts when a transistor $Q_{8-R}$ is OFF. The states of the transistors $Q_{7-R}$ and $Q_{8-R}$ are determined by the state of the bistable circuit $1_{1-R}$, as now explained. The bistable circuit $1_{1-R}$ is connected across a zener diode $Z_{1-R}$ which provides a stable floating reference voltage for the stage, connected, as shown, through a control and buffer circuit comprising transistors $Q_{3-R}$, $Q_{4-R}$, $Q_{5-R}$ and $Q_{6-R}$ to the bistable circuit $1_{1-R}$. The bistable circuit $1_{1-R}$ is a complementary metal oxide semiconductor circuit consisting of field effect transistors $A_{1-R}$, $A_{2-R}$, $A_{3-R}$, and $A_{4-R}$, resistances $R_{3-R}$, $R_{4-R}$ and $R_{5-R}$ and capacitors $C_{B-R}$ and $C_{14-R}$. The state (1 or 0) of the flip-flop $1_{1-R}$ controls which of the transistors $Q_{3-R}$, $Q_{4-R}$, $Q_{6-R}$ and $Q_{5-R}$ is conducting (the transistors $Q_{3-R}$-$Q_{6-R}$ and $Q_{4-R}$-$Q_{5-R}$ always conduct in pairs) and, therefore, which of the transistors $Q_{7-R}$ and $Q_{8-R}$ is in the conducting state; and the latter, as noted above, determine whether the transistor $Q_{1-R}$ or the transistor $Q_{2-R}$ is conducting. The bistable circuit is triggered from one to the other of its two stable states by a trigger circuit $2_{1-R}$ that comprises light sensitive diodes $D_{2-R}$ and $D_{4-R}$ which are serially connected across the zener diode $Z_{1-R}$ to act as a voltage divider whose center voltage at the serial connection 25 is connected as input 22 to the first pair of field effect transistors $A_{1-R}$ and $A_{2-R}$. The state of conduction of the diodes $D_{2-R}$ and $D_{4-R}$ is controlled by radiation from light-emitting diodes $D_{1-R}$ and $D_{3-R}$, respectively, and the latter are controlled by a program control 38 (see FIG. 1).

FIG. 2 is a complete circuit diagram of one basic stage of an electric power system, as above mentioned, and includes a resistance $R_{15-R}$ which is connected between the base and emitters of the complementary emitter follower pair $Q_{9-R}$, $Q_{10-R}$ to allow the terminal $T_{3-R}$ to rise (or fall) to the same potential as the terminal shown at $T'_{3-R}$ in a static (no load) condition. Capacitors $C_{3-R}$, $C_{4-R}$, and $C_{5-R}$ are connected as shown for the following reasons: the capacitor $C_{5-R}$ supplies the charge for the current that occurs when the bistable circuit $1_{1-R}$ changes state (all four units therein are on for a short time) and thus allows the zener diode $Z_{1-R}$ to remain conducting at all times. This provides a filtering action to suppress the voltage spikes from the bases of the transistor pairs $Q_{3-R}$ -$Q_{4-R}$ and $Q_{5-R}$-$Q_{6-R}$; the spikes, if allowed to occur, would be amplified by the transistors $Q_{1-R}$ and $Q_{2-R}$ and would appear at the output terminal $T_{3-R}$. The need for capacitors $C_{3-R}$ and $C_{4-R}$ stems not from the basic circuit per se, but they are needed when the stage is used in conjunction with other like stages to form a system as is explained in said parent application. The two integrator networks designated $R_{8-R}$-$C_{8-R}$ and $R_{9-R}$-$C_{9-R}$ are connected as feedback paths around the transistors $Q_{2-R}$ and $Q_{1-R}$; these components, also, serve the extremely important function of enhancing the Miller effect whenever a given stage is not triggered yet others in the chain are. Diodes $D'_{6-R}$ and $D_{6-R}$ are clamp diodes to prevent damage to the emitter-base of transistors $Q_{7-R}$ and $Q_{8-R}$ when surge currents are carried by capacitors $C_{6-R}$ and $C_{7-R}$; and resistors $R_{10-R}$ and $R_{11-R}$ act as d-c return paths for the base-emitter circuits of $Q_{7-R}$ and $Q_{8-R}$.

Figure 1:
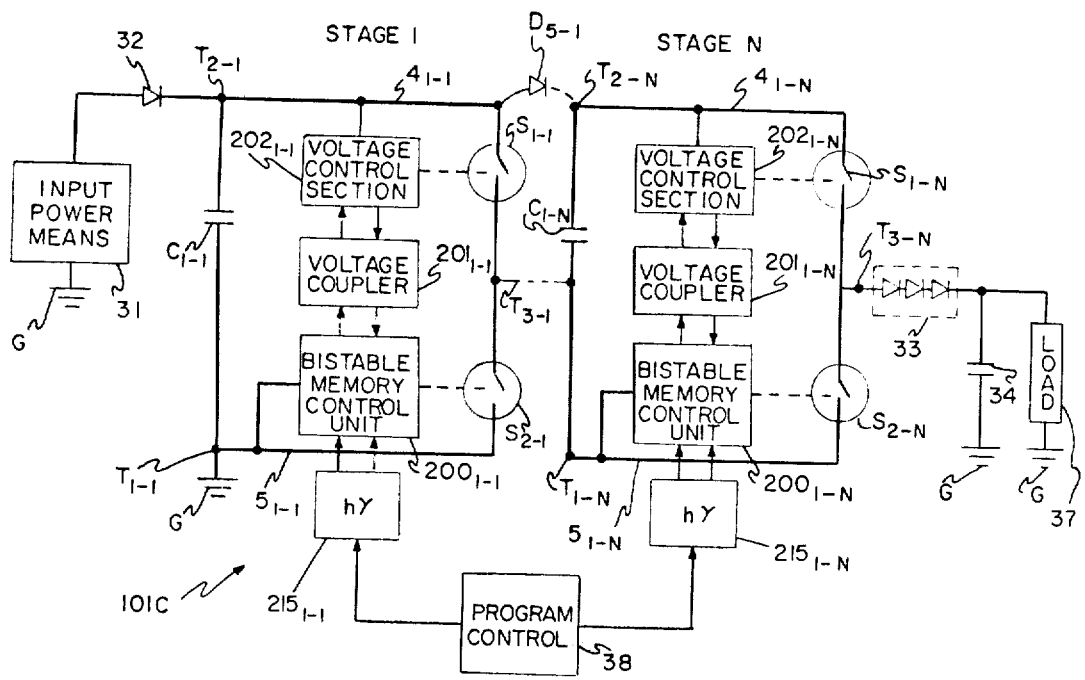
FIG. 1 is a schematic representation (partially in block diagram form) of a low-power loss, light-triggered electric system comprising a plurality of stages connected in cascade.
Figure 3:
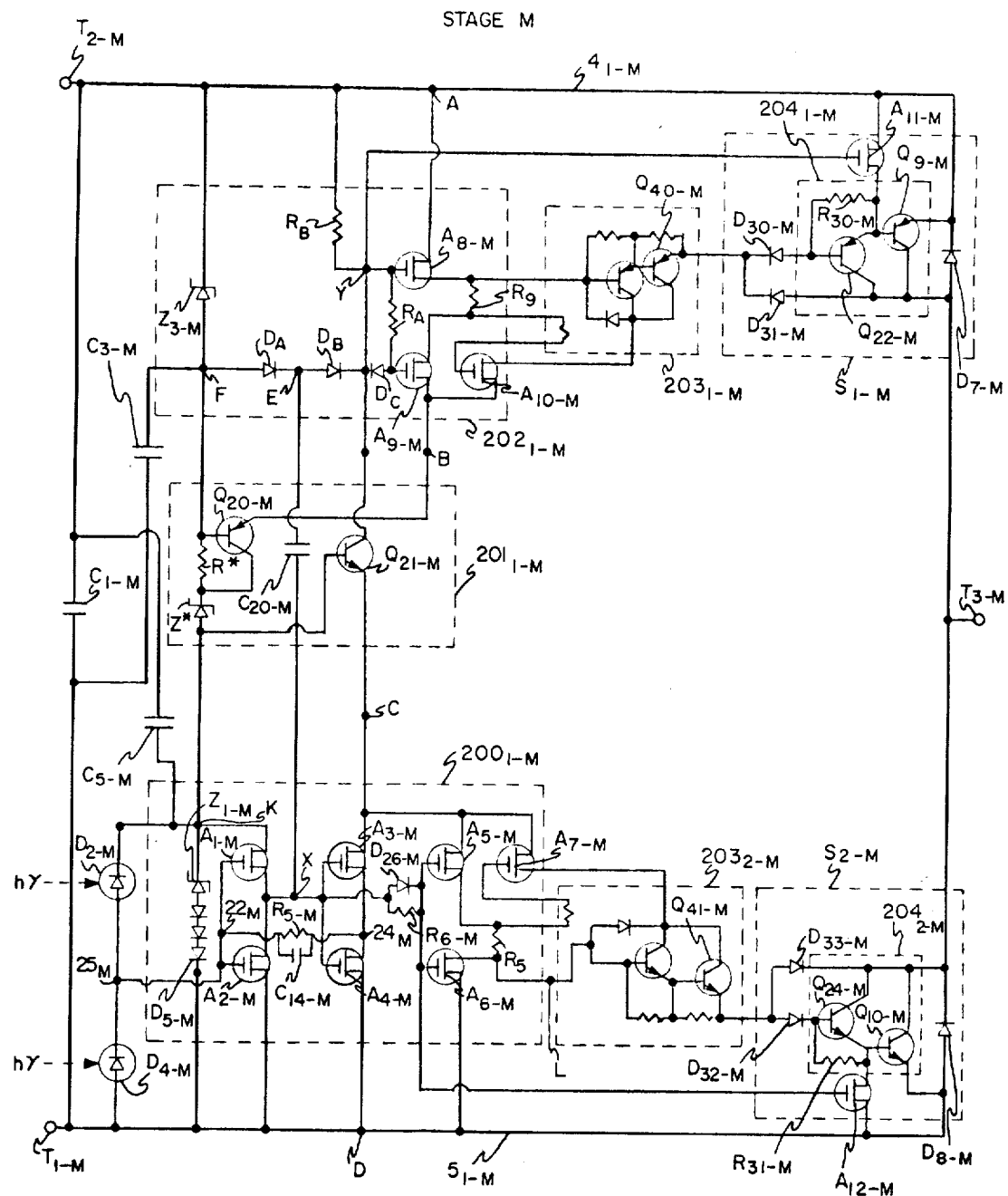
FIG. 3 is a schematic representation showing details of one stage of the low-power loss, light-triggered electric system of FIG. 1 having bilateral semiconductor switches or switching circuits that differ from the switching circuits of the stage of FIG. 2.

The circuitry to be described now in connection with FIGS. 1 and 3 has a number of elements that differ from those shown in FIG. 2 and the physical arrangement also differs, the latter to permit use of standard commercial chips for some basic functions and to enhance functioning characteristics of the elements as well as to allow use of low-voltage transistors in parts of the circuit with enhancement of circuit capability. The electric system shown at 101C in FIG. 1 is a low-power loss, light-triggered high-voltage electric power source that comprises a plurality of stages 1 . . . N connected in cascade. (Triggering is effected by the optical coupling networks represented by the boxes $215_{1-1}$ . . ., which are similar to the trigger circuit $2_{1-R}$ in FIG. 2.) Each of the stages, as shown in more detail in the single stage of FIG. 3, generally comprises supply voltage means $C_{1-1}$ . . . $C_{1-N}$ connected along alternate first and second electrically conductive paths $4_{1-1}$ . . . $4_{1-N}$ and $5_{1-1}$ . . . $5_{1-N}$ to, respectively, respective third terminals $T_{3-1}$ . . . $T_{3-N}$. Switches or switching circuits $S_{1-1}$ . . . $S_{1-N}$ and $S_{2-1}$ . . . $S_{2-N}$, connected between the supply voltage means $C_{1-1}$ . . . $C_{1-N}$ and respective terminal $T_{3-1}$ . . . $T_{3-N}$, are operable to determine which side of the supply voltage means is connected to the respective terminal.

A light actuated bistable memory and control circuit or unit $200_{1-1} \ldots 200_{1-N}$ is connected, as later explained, to control the respective switches $S_{1-1}, S_{2-1} \ldots S_{1-N}, S_{2-N}$, one state of the bistable portion of the respective unit $200_{1-1} \ldots 200_{1-N}$ acting to render conductive one of said paths and the other state of the bistable portion of the respective unit $200_{1-1} \ldots 200_{1-N}$ acting to render conductive the other of said paths as alternate conditions of system operation. The stages 1 ... N each includes a voltage control section $202_{1-1} \ldots 202_{1-N}$ that includes a plurality of field effect transistors, as later discussed, and further includes a voltage coupler $201_{1-1} \ldots 201_{1-N}$ connected between the bistable memory and control unit of that stage and the associated voltage control section. A complete explanation is hereinafter made in connection with FIG. 3 which shows any one of the stages 1 ... N of FIG. 1 and which is designated stage M. As can be seen in FIG. 3, the bilateral switches $S_{1-1}$, $S_{2-1} \ldots S_{1-N}, S_{2-N}$ of FIG. 1 are designated $S_{1-M}$ and $S_{2-M}$ in FIG. 3 and are shown as semiconductor switches or switching circuits. Also in FIG. 3 there are shown pre-amplifiers $203_{1-M}$ and $203_{2-M}$ between the switches $S_{1-M}$ and $S_{2-M}$, respectively and the voltage control section, labeled $202_{1-M}$, and the light-actuated, bistable memory and control unit labeled $200_{1-M}$, respectively. It will be further appreciated that a number of elements in FIG. 3 perform identical functions to corresponding elements in FIG. 2 and the labeling chosen mostly reflects that identity, e.g., $D_{2-M}$ and $D_{4-M}$ correspond to $D_{2-R}$ and $D_{4-R}$ in FIG. 2. It is explained in the parent application that the capacitors $C_{1-1} \ldots C_{1-N}$ are charged when the switches $S_{2-1} \ldots S_{2-N}$ are closed and are serially connected to the load 37 when the switches $S_{1-1} \ldots S_{1-N}$ are closed. Hereinafter in connection with the explanation of an overload protection circuit, the first-mentioned condition is sometime referred to as the OFF state of the system 101C, but this means, in the context used, merely that the load 37 is disconnected from the capacitors $C_{1-1} \ldots C_{1-N}$ for short-circuit or overload protection.

Figure 5A:
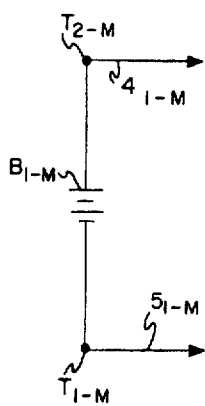
FIG. 5A shows a part of the stage of FIG. 3 with a battery replacing the capacitor between the terminals labeled $T_{1-M}$ and $T_{2-M}$ of the stage.
Figure 5B:
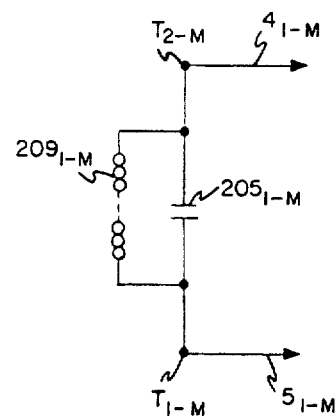
FIG. 5B shows a part of the stage of FIG. 3 with a solar battery replacing the capacitor between the terminals $T_{1-M}$ and $T_{2-M}$.

Stage M contains a supply voltage means $C_{1-M}$ connected along two alternate paths $4_{1-M}$ and $5_{1-M}$ to an electric terminal $T_{3-M}$ of the stage. The bilateral switches $S_{1-M}$ and $S_{2-M}$, as shown, are connected between the supply voltage means $C_{1-M}$ and the terminal $T_{3-M}$ and are operable to determine which of the two paths (i.e., either of the path $4_{1-M}$ or the path $5_{1-M}$) is conductive thereby to determine which side of the supply voltage means is connected to the terminal $T_{3-M}$. The bistable memory and control circuit $200_{1-M}$, as noted, is connected to control the switches $S_{1-M}$ and $S_{2-M}$, one state of the bistable portion of the circuit $200_{1-M}$ acting to render conductive one of said paths and the other state of the bistable portion of the circuit acting to render conductive the other of said paths as alternate conditions of system operation. Stage M has a voltage control section $202_{1-M}$, that includes a plurality of field effect transistors $A_{8-M}, A_{9-M}$ and $A_{10-M}$, and a voltage coupler $201_{1-M}$ connected between the bistable memory and control circuit $200_{1-M}$ and the voltage control section $202_{1-M}$. The supply voltage means $C_{1-M}$ is shown as a capacitor, but as is shown in FIGS. 5A and 5B, it can also take the form of a battery $B_{1-M}$ or a solar battery consisting of a solar-cell string $209_{1-M}$ and a capacitor $205_{1-M}$, in combination.

Figure 4A:
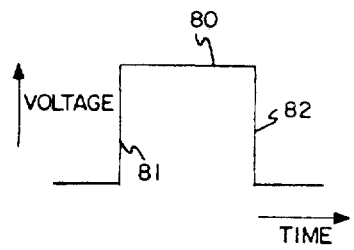
FIG. 4A shows a voltage pulse of a type available at the output terminal of the stage of FIG. 3, the pulse having substantially vertical leading and trailing edges.
Figure 4B:
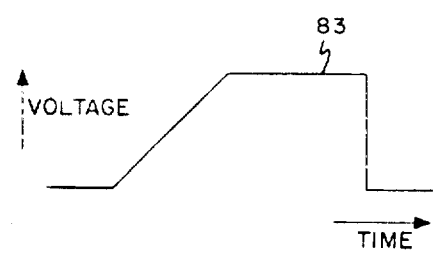
FIG. 4b shows a pulse like the pulse of FIG. 4A except with an inclined leading edge.
Figure 4C:
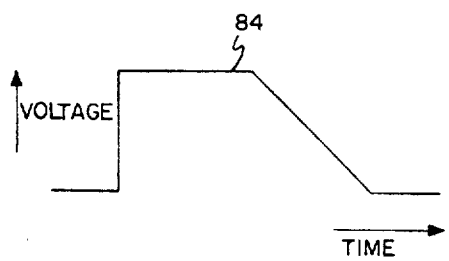
FIG. 4C shows a pulse like the pulse of FIG. 4A except with an inclined trailing edge.

The first of three floating reference voltage means shown in FIG. 3 is a zener diode $Z_{1-M}$ and series diodes $D_{5-M}$ connected to energize the bistable memory and control circuit $200_{1-M}$; the second of the three floating reference voltage means is a second zener diode $Z^*$ and a resistor $R^*$ in series, connected to control the voltage coupler $201_{1-M}$; and the third of the three floating reference voltage means is a zener diode $Z_{3-M}$ connected to energize the voltage control section $202_{1-M}$. The three zener diodes $Z_{1-M}, Z^*$ and $Z_{3-M}$, the resistor $R^*$, and the series diodes $D_{5-M}$ form a series string across the supply voltage means $C_{1-M}$, so that the individual reference voltage is derived from the capacitor $C_{1-M}$. The independent reference voltages supplied by zener diodes $Z_{1-M}$ and $Z_{3-M}$ (in conjunction with resistances $R_9$ and $R_5$ or other switched by transistors $A_{8-M}, A_{9-M}$ and $A_{5-M}$, $A_{6-M}$) resistance and capacitance combinations permit output waveforms at $T_{3-M}$, for example, having the form of the pulses shown at 80 in FIG. 4A with a leading edge 81 similar to its lagging edge 82 or the further pulses 83, 84 or 85 of FIGS. 4B, 4C and 4D. Further, as will be made clearer hereinafter, the multiple floating reference voltage means shown permits wide modification of the amplitude of the pulses 80, 83 ... merely by rendering changes in $R^*, Z^*$ and/or some other circuit elements, but no change need be made, for example, in either the bistable memory and control circuit $200_{1-M}$ or the voltage control section $202_{1-M}$. The floating reference voltage means are shown in the figures within the block of the circuit element controlled, but each is discussed and claimed as a separate element, which it is or can be.

The bistable memory and control unit $200_{1-M}$ comprises field effect transistors $A_{1-M}, A_{2-M}, A_{3-M}$ and $A_{4-M}$ which form the bistable or memory portion of the unit $200_{1-M}$ and further field effect transistors $A_{5-M}$ and $A_{6-M}$ which form the control portion thereof, as well as still another field effect transistor $A_{7-M}$ which is needed only in those instances when the pre-amplifier shown at $203_{2-M}$ (comprising a transistor $Q_{41-M}$ as the second stage thereof) is in the circuit. In this circuit, the zener diode $Z_{1-M}$ and the diodes $D_{5-M}$ furnish a floating reference voltage for operating the bistable memory and control unit $200_{1-M}$. A capacitor $C_{5-M}$ passes transients so that the reference voltage remains smooth. An RC network $R_{5-M}$-$C_{14-M}$ couples input/output terminals $22_M$ and $24_M$, respectively, of the bistable portion. A resistor $R_{6-M}$ and a diode $D_{26-M}$ act, in combination, to provide a coupling path between the control portion and the bistable portion of the bistable memory and control circuit $200_{1-M}$.

Operation of the bistable memory and control circuit $200_{1-M}$ and the way it interacts with other circuit elements to control the switches $S_{1-M}$ and $S_{2-M}$ are explained in this paragraph. When the light sensitive diode $D_{2-M}$ is illuminated, its resistance drops. This change in resistance triggers the bistable portion of the circuit $200_{1-M}$ such that the transistor $A_{1-M}$ is biased OFF, the transistor $A_{2-M}$ is biased ON, the transistor $A_{9-M}$ is biased OFF, transistor $A_{8-M}$ biased ON, the transistor $A_{5-M}$ is biased ON, the transistor $A_{6-M}$ is biased OFF, after some delay the transistor $A_{7-M}$ is biased OFF and a transistor $A_{12-M}$ in the switch $S_{2-M}$ is biased OFF. These states of the mosfet components provide the necessary conductive paths and base-emitter voltages such that the lower chain pre-amplifier $203_{2-M}$ and the switch $S_{2-M}$ are turned ON. Thus, the load terminal $T_{3-M}$ at this juncture is connected to the path $5_{1-M}$. When the light sensitive diode $D_{4-M}$ is triggered by light, the states of the mosfet transistors $A_{1-M}, A_{2-M} \ldots$ above interchange and a transistor $A_{11-M}$ in the switch $S_{1-M}$, which was ON, turns OFF, thereby allowing the turning ON of the upper chain (i.e., the pre-amplifier shown at $203_{1-M}$ and the switch $S_{1-M}$), connecting the terminal $T_{3-M}$ to the path $4_{1-M}$ and turning OFF the lower chain (i.e., the pre-amplifier $203_{2-M}$ and the switch $S_{2-M}$).

The voltage coupler $201_{1-M}$ includes a bipolar p-n-p transistor $Q_{20-M}$ and a bipolar n-p-n transistor $Q_{21-M}$ connected to couple the voltage control section $202_{1-M}$ and the memory and control circuit $200_{1-M}$; it includes, also, a trigger capacitor $C_{20-M}$. The p-n-p transistor $Q_{20-M}$ and the n-p-n transistor $Q_{21-M}$ perform d-c coupling and the trigger capacitor $C_{20-M}$ performs a-c coupling. When the states of the bistable portion of the bistable memory and control unit $200_{1-M}$ are such that load terminal $T_{3-M}$ is connected to the terminal $T_{1-M}$, only the transistor $Q_{21-M}$ is ON so that it supplies a path for the necessary base and collector currents for the Darlington-pair in the pre-amplifier circuit $203_{2-M}$. When the terminal $T_{3-M}$ is connected to the terminal $T_{2-M}$, only the transistor $Q_{20-M}$ is ON and it provides base and collector currents for the Darlington-pair in the upper chain pre-amplifier $203_{1-M}$. The resistor R* and the zener diode Z* maintain a continuous dc current path for the reference voltage, the values of R* and Z* being subject to change depending on the voltage of each stage of the system 101C. The capacitor $C_{20-M}$ couples the changes in the state of the bistable portion of the unit $200_{1-M}$ by transferring signals from $200_{1-M}$ to the mosfet transistors $A_{8-M}$, $A_{9-M}$ and $A_{10-M}$ in the voltage control section $202_{1-M}$ and also to the mosfet transistor $A_{11-M}$ in the switching circuit $S_{1-M}$. For switching conditions requiring high voltage, the transistor $Q_{21-M}$ is connected in a series mode with like units, as later discussed.

The voltage control section $202_{1-M}$ serves the basic purpose of setting the switching states of the switch $S_{1-M}$ by controlling the base-emitter voltage of a transistor $Q_{9-M}$ and collector-base currents of a Darlington-pair $204_{1-M}$ in the switch $S_{1-M}$. Furthermore, it provides separate d-c current paths whenever the switch $S_{1-M}$ or the switch $S_{2-M}$ is in the ON state. The voltage control section $202_{1-M}$ comprises two sub-sections: a floating reference voltage and a complementary ON-OFF circuit. The zener diode $Z_{3-M}$ furnishes the floating reference voltage; a capacitor $C_{3-M}$ suppresses transients. The mosfet transistors $A_{8-M}$ and $A_{9-M}$ form the basic complementary inverter pair. The current drawn by the transistor $Q_{21-M}$ which flows through a resistor $R_B$ sets the voltage level for the control of transistors $A_{8-M}$ and $A_{9-M}$. Diodes $D_A$, $D_B$ and $D_C$ provide the necessary conductive and cut-off paths. A resistor $R_A$ along with the parasitic capacitance of the transistor $A_{9-M}$ constitutes a delay network to avoid any similar-states overlap of the switches $S_{1-M}$ and $S_{2-M}$ at the switching cross-over time.

The operation of the circuit in FIG. 3 can be explained in the following manner. At this juncture the point labeled X in the memory portion of the bistable memory and control circuit $200_{1-M}$ in this explanation is turned or switched to the low state (i.e., the transistor $A_{1-M}$ is turned OFF and transistor $A_{2-M}$ is turned ON). There is in this situation a falling pulse voltage which, via the coupling capacitor $C_{20-M}$, decreases the voltage of the point marked Y, thereby setting the transistors $A_{11-M}$ ON, $A_{8-M}$ ON, $A_{9-M}$ OFF and $A_{10-M}$ ON. The transistor $A_{11-M}$ is ON at this time of system operation; therefore, there is no base-emitter voltage for the transistor $Q_{9-M}$ which is, therefore, turned OFF. Also, since the transistor $A_{9-M}$ is OFF, there is no base current for the Darlington-pair in the pre-amplifier $203_{1-M}$. Hence, the terminal $T_{3-M}$ is disconnected from the terminal $T_{2-M}$. When the point X changes to the high voltage condition, the states of the mosfet transistors in the upper-chain also change and therefore the switch $S_{1-M}$ is turned ON and the terminal $T_{3-M}$ is connected to the terminal $T_{2-M}$.

The switch $S_{1-M}$ comprises a pair of bipolar, high-voltage, high-current p-n-p transistors $Q_{22-M}$ and $Q_{9-M}$ making up the Darlington-pair $204_{1-M}$; it includes, also, a low-voltage silicon diode $D_{30-M}$ connected in series with the input to the Darlington-pair $204_{1-M}$ and a high voltage silicon diode $D_{31-M}$ connected from the collector of the Darlington-pair $204_{1-M}$ to the input thereof. The Darlington-pair $204_{1-M}$ further includes a resistance $R_{30-M}$; and the switch $S_{1-M}$ further includes the field effect transistor $A_{11-M}$ which when on, serves to reduce to zero the voltage between base and emitter of the transistor $Q_{9-M}$, thereby turning it OFF.

The complementary switch $S_{2-M}$ comprises a pair of bipolar, high-voltage, high-current n-p-n transistors $Q_{24-M}$ and $Q_{10-M}$ in a Darlington-pair $204_{2-M}$; it includes, also, a low-voltage silicon diode $D_{32-M}$ connected in series with the input to the Darlington-pair $204_{2-M}$ and a high-voltage silicon diode $D_{33-M}$ connected from the collector of the Darlington-pair $204_{2-M}$ to the input thereof; the Darlington-pair $204_{2-M}$ further includes a resistor $R_{31-M}$; and the switch $S_{2-M}$ further includes the field effect transistor $A_{12-M}$ which performs the same function as does the transistor $A_{11-M}$.

The diodes $D_{30-M}$ and $D_{31-M}$ in the switch $S_{1-M}$ and the diodes $D_{32-M}$ and $D_{33-M}$ in the switch $S_{2-M}$ serve to prevent the associated transistors from going into saturation thereby reducing delays in the switching sequence and avoiding short circuiting of the supply voltage means $C_{1-M}$. The diodes in the switches $S_{1-M}$ and $S_{2-M}$ in the circuit configuration shown are in a back-clamp mode.

The next few paragraphs contain descriptions of modifications of the switches $S_{1-M}$ and $S_{2-M}$. To simplify the explanation and the figures, essentially only those parts of the circuitry of FIG. 3 which are changed appear in the figures discussed. Also, the circuit junction points designated A, B, C, D, E, F and K in FIG. 3 appear as connection points in the further figures and serve to locate the points at which the new circuit elements in the latter figures are connected into the circuit of FIG. 3. All the other circuit elements, e.g., the lements $200_{1-M}$ etc., generally remain as shown in FIG. 3. When the circuit elements perform the same function as that served in FIG. 3, an attempt is made to apply the same or similar labeling. Thus, the diodes $D_{7-M}$ and $D_{8-M}$ perform the same function in all the figures and in the same way; whereas the switches labeled $S_{1A-M}$ and $S_{2A-M}$, for example, in FIG. 7 perform the same function as the switches $S_{1-M}$ and $S_{2-M}$, but the circuitry differs.

Figure 7:
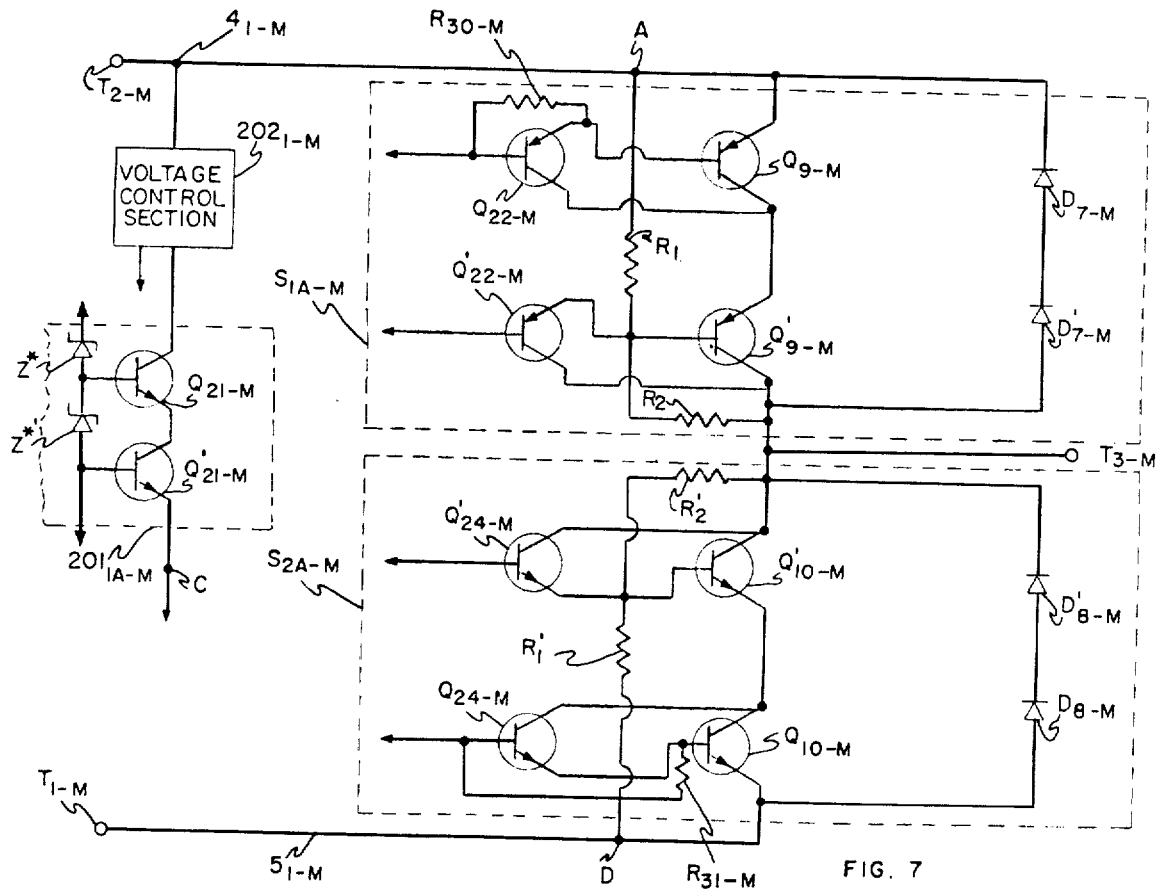
FIG. 7 shows schematically a part of a stage like the stage of FIG. 3, but showing a modification of the semiconductor switching circuits of the stage of FIG. 3, the semiconductors of the modified circuits being connected in a stacked or series mode to furnish a high voltage output from the stage.

The switches $S_{1-M}$ and $S_{2-M}$ are each a buffer amplifier in which the transistors $Q_{9-M}$ and $Q_{10-M}$, respectively, act in combination with diodes $D_{7-M}$ and $D_{8-M}$, respectively, to give the bilateral current carrying characteristic. The functions of the switch $S_{1-M}$ can be performed by the switch $S_{1A-M}$ in FIG. 7 which shows a plurality of transistors $Q_{9-M}$, $Q'_{9-M}$ . . . and $Q_{22-M}$, $Q'_{22-M}$ . . . and diodes $D_{7-M}$, $D'_{7-M}$ . . . in a series arrangement for high voltage. Similarly the function of the switch $S_{2-M}$ can be performed by the switch $S_{2A-M}$ in FIG. 7 which shows a plurality of transistors $Q_{10-M}$, $Q'_{10-M}$ ... and $Q_{24-M}$, $Q'_{24-M}$ ..., and diodes $D_{8-M}$, $D'_{8-M}$ ... in a series arrangement for high voltage. When the serially-connected configuration of FIG. 7 is used, the n-p-n transistor $Q_{21-M}$ in the voltage coupler designated $201_{1A-M}$ is replaced by a plurality of serially-connected transistors $Q_{21-M}$, $Q'_{21-M}$ ... In this situation the zener diode Z* is replaced by a plurality of zener diodes Z*, Z*' ... so that each n-p-n transistor in the string has across it the same voltage as in the case for the single transistor-zener diode combination to keep the current through the floating reference voltage string the same as it is in the circuit of FIG. 3 (i.e., typically 2 microamperes). Resistors $R_1$, $R_2$, $R'_1$, and $R'_2$ perform a voltage division function to divide the voltages equally on the output transistors $Q'_{9-M}$, $Q_{9-M}$, $Q_{10-M}$ and $Q'_{10-M}$.

Figure 8:
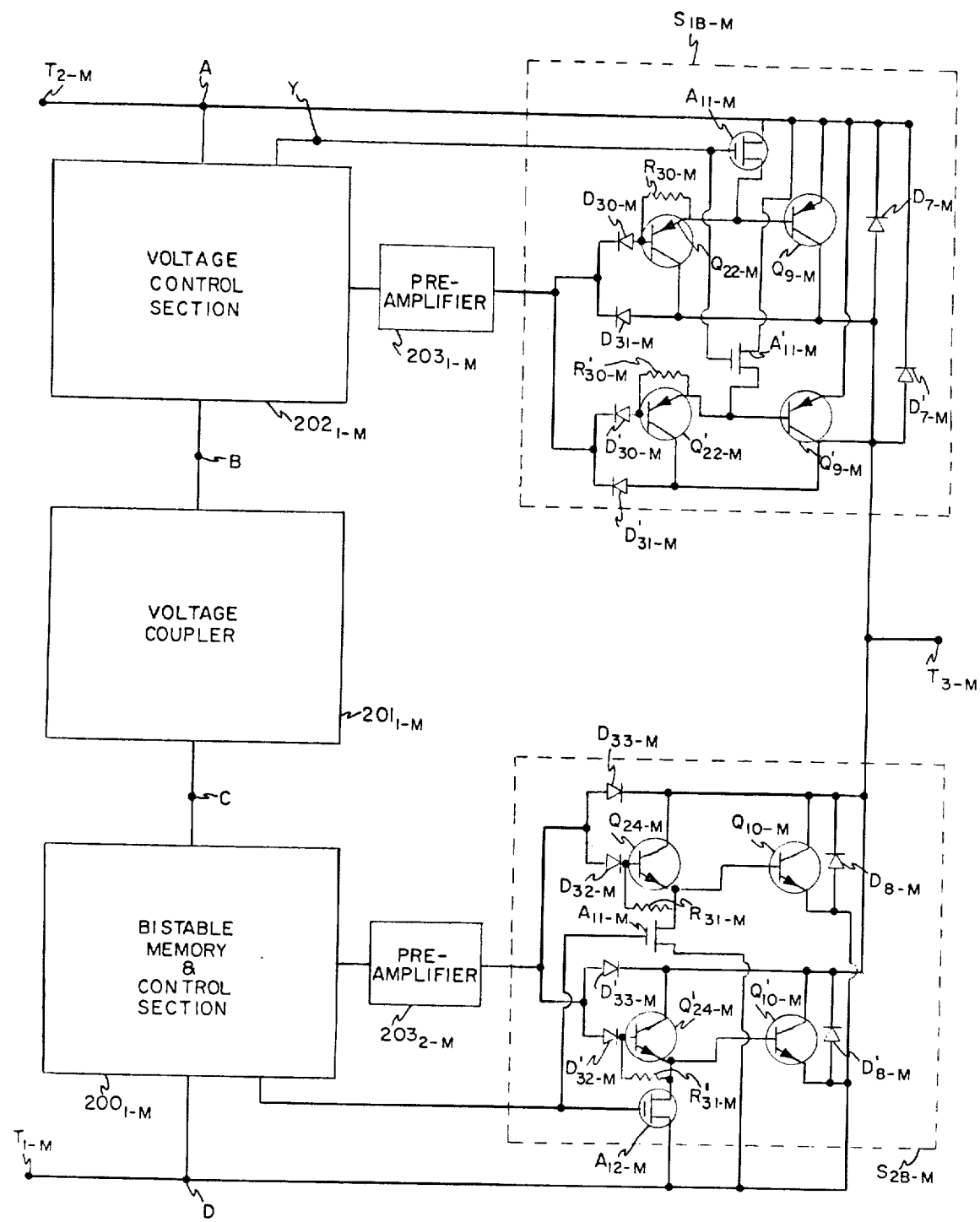
FIG. 8 shows a further modification wherein the semiconductors of the modified switching circuit shown are connected in a shunt mode to furnish a high electric current output from the stage.

For high electric current requirements, the series arrangement discussed in the previous paragraph can be replaced by the shunt-mode switches labeled $S_{1B-M}$ and $S_{2B-M}$ in FIG. 8. When the shunt-mode is employed, the first preamplifier $203_{2-M}$ in FIGS. 3 and 8 is connected between the bistable memory and control circuit $200_{1-M}$ and the buffer amplifier switch $S_{2B-M}$ (which replaces the switch $S_{2-M}$), and the second pre-amplifier $203_{1-M}$ is connected between the voltage control section $202_{1-M}$ and the buffer amplifier switch $S_{1B-M}$ (which replaces the switch $S_{1-M}$). In FIG. 8 the shunt mode in the switch $S_{1B-M}$ is accomplished by parallel connecting the transistors $Q_{9-M}$ and $Q'_{9-M}$ with the transistors $Q_{22-M}$ and $Q'_{22-M}$, respectively, and the diodes $D_{7-M}$ and $D'_{7-M}$ are similarly paralleled, as shown. The shunt mode in the switch $S_{2B-M}$ is sililarly effected by appropriate connection of the complementary elements shown. The switching circuit $S_{1A-M}$ in FIG. 7 can be combined with the switching circuits $S_{1B-M}$ in FIG. 8 in a series-shunt mode to provide both high-voltage and high-electric-current capability; and the switching circuits $S_{2A-M}$ and $S_{2B-M}$, in this system, would likewise be interconnected. In the circuitry of FIG. 8 the zener diode Z* and the resistor R* do not change.

Figure 9:
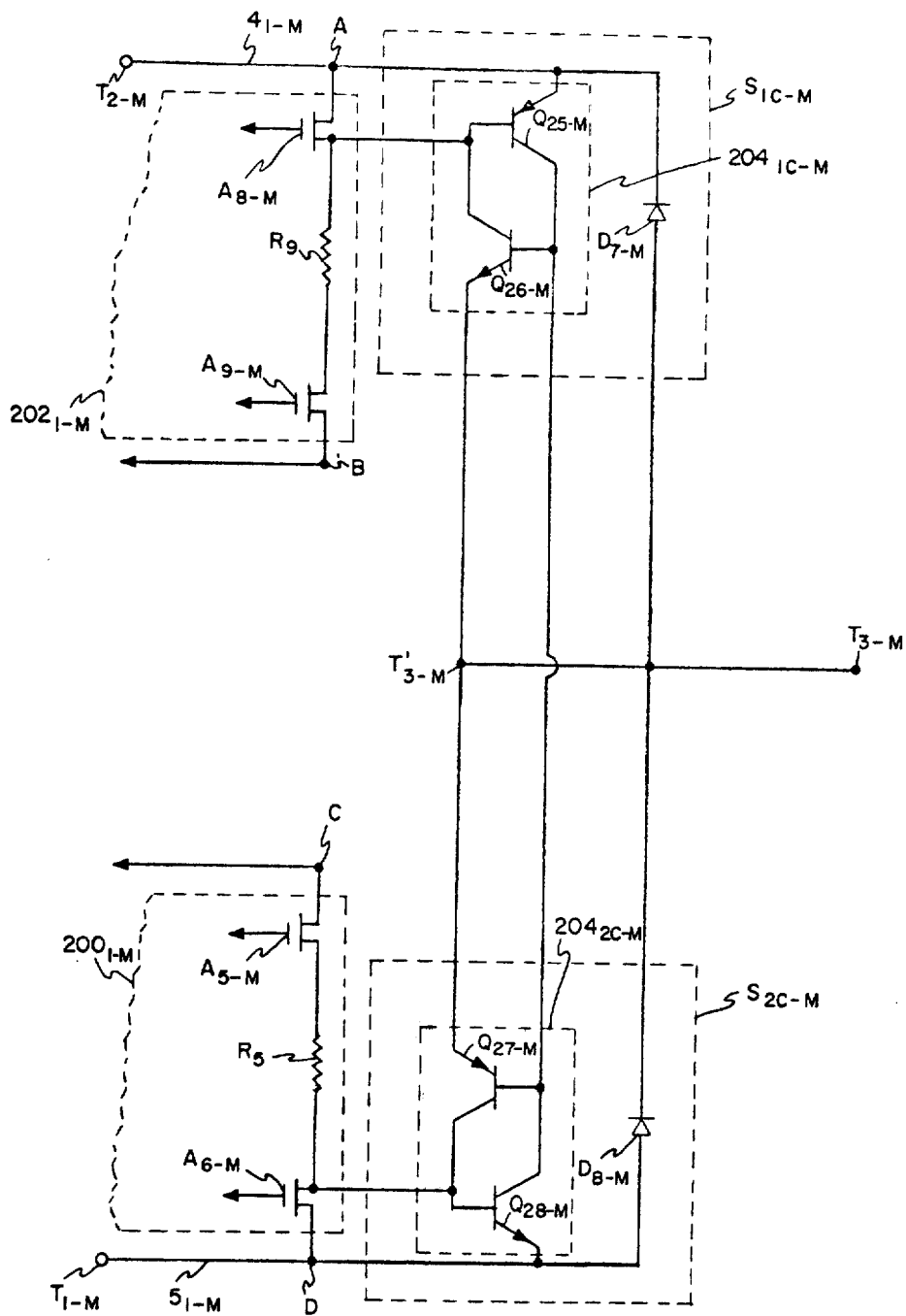
FIG. 9 shows a further modification wherein the semiconductors of the modified switching circuits are connected in a saturated SCR-mode.

FIG. 9 contains a basic schematic of SCR-mode switches $S_{1C-M}$ and $S_{2C-M}$. This circuit is symmetrical about the load-terminal line $T_{3-M}$-$T'_{3-M}$ and serves the purpose of connecting the load terminal $T_{3-M}$ to either the high voltage terminal $T_{2-M}$ or the low voltage terminal $T_{1-M}$ of the stage. The mosfet transistor pairs $A_{8-M}$-$A_{9-M}$ and $A_{5-M}$-$A_{6-M}$ act as the basic complementary inverters which respond to the set/reset stages of the memory and control unit $200_{1-M}$; the resistors $R_9$ and $R_5$ are the load resistors of the complementary inverters; and the complementary bipolar transistor pairs labeled $204_{1C-M}$ and $204_{2C-M}$ comprise transistors $Q_{25-M}$-$Q_{26-M}$ and $Q_{27-M}$-$Q_{28-M}$, respectively, connected in an SCR-mode, that is, a regenerative loop in which the collector current of one transistor constitutes the base current of other transistors in the pair so that available current at the node terminal $T'_{3-M}$ gets amplified by $\beta^2$ times the base current.

The operation of the circuit of FIG. 9 is explained in this paragraph. It is assumed now that the state of the bistable memory and control circuit $200_{1-M}$ is such that the transistor $A_{6-M}$ is ON. In this situation, due to the complementary, inverter selection of the mosfet components, the transistor $A_{5-M}$ is OFF, $A_{9-M}$ is ON and $A_{8-M}$ is OFF. The ON state of transistor $A_{6-M}$ implies no base-emitter driving voltage (i.e., no gate voltage in the SCR-mode) is available for the transistor $Q_{28-M}$ which is, therefore, OFF. Since the base of collector currents of the transistor $Q_{28-M}$, which feed the transistor $Q_{27-M}$, are zero, the latter also is OFF. Thus, the switch $S_{2C-M}$ is in the OFF state and the load terminal $T_{3-M}$ is not connected to $T_{1-M}$. Since the transistor $A_{8-M}$ is OFF and $A_{9-M}$ is ON; a base-emitter voltage (i.e., gate voltage for SCR mode) for the transistor $Q_{25-M}$ is available, which makes it ON. When ON, the transistor $Q_{25-M}$ supplies the base and collector currents to the transistor $Q_{26-M}$ which is also put in the ON state. When both of the transistors $Q_{25-M}$ and $Q_{26-M}$ are ON, the switch $S_{1C-M}$ is in the ON state, thereby providing a conductive path (high current capability) between the load terminal $T_{3-M}$ and the high voltage terminal $T_{2-M}$. When the bistable memory and control circuit $200_{1-M}$ changes state, the transistor $A_{8-M}$ is turned ON, $A_{9-M}$ is turned OFF, and the switch $S_{1C-M}$ is therefore OFF while the switch $S_{2C-M}$ is ON, thereby connecting the terminal $T_{3-M}$ to the terminal $T_{1-M}$.

Figure 4D:
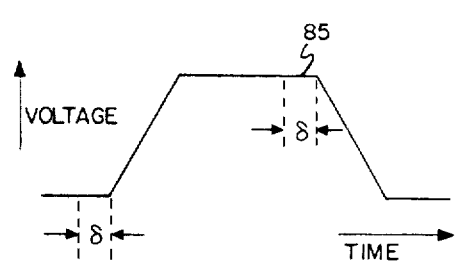
FIG. 4D shows a pulse like the pulse of FIG. 4A except with an inclined leading edge and an inclined trailing edge.
Figure 10:
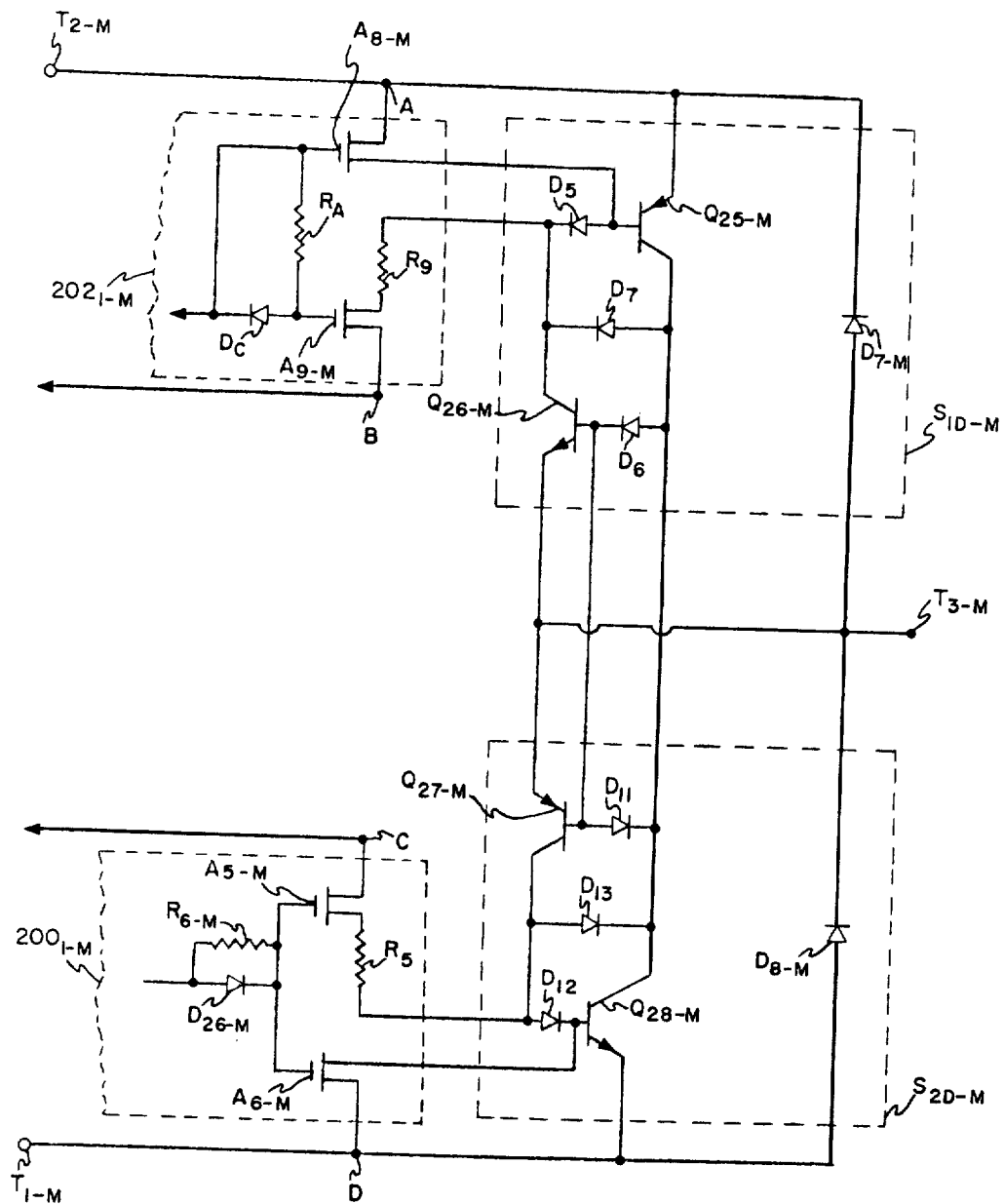
FIG. 10 shows a modification, like the modification of FIG. 9, but illustrates unsaturated switching circuits.

In the circuit of FIG. 9, the SCR-mode bipolar transistors $Q_{25-M}$ ... when in the active state are saturated and the resulting stored charge implies that set-reset commands of the bistable memory and control unit $200_{1-M}$ are not immediately followed, resulting in a delayed $\delta$ of the lagging edges of the switched pulse waveforms (see the pulse in FIG. 4D). For uses wherein fast pulse edges is an important requirement, the circuit of FIG. 9 is modified, as shown in FIG. 10 wherein the bilateral output switches are labeled $S_{1D-M}$ and $S_{2D-M}$. In the modified circuit, diodes $D_5$, $D_6$, $D_{11}$, $D_{12}$ are inserted in the base inputs of the associated transistors. Diodes $D_7$ and $D_{13}$ are respectively connected across the collectorbase portion of the transistor pairs $Q_{25-M}$-$Q_{26-M}$ and $Q_{27-M}$-$Q_{28-M}$. This diode clamping arrangement always maintains a finite (~0.7v) voltage differential between the collector and emitter, thereby keeping the associated transistor out of saturation. Thus, the collector current of the particular transistor tracks the base-emitter voltage state and the switches $S_{1D-M}$ and $S_{2D-M}$ have fast response times. The slight changes in the connection of the resistors $R_9$ and $R_5$ should be noted. The switching operation of the modified circuit is similar to that of FIG. 9.

Figure 11:
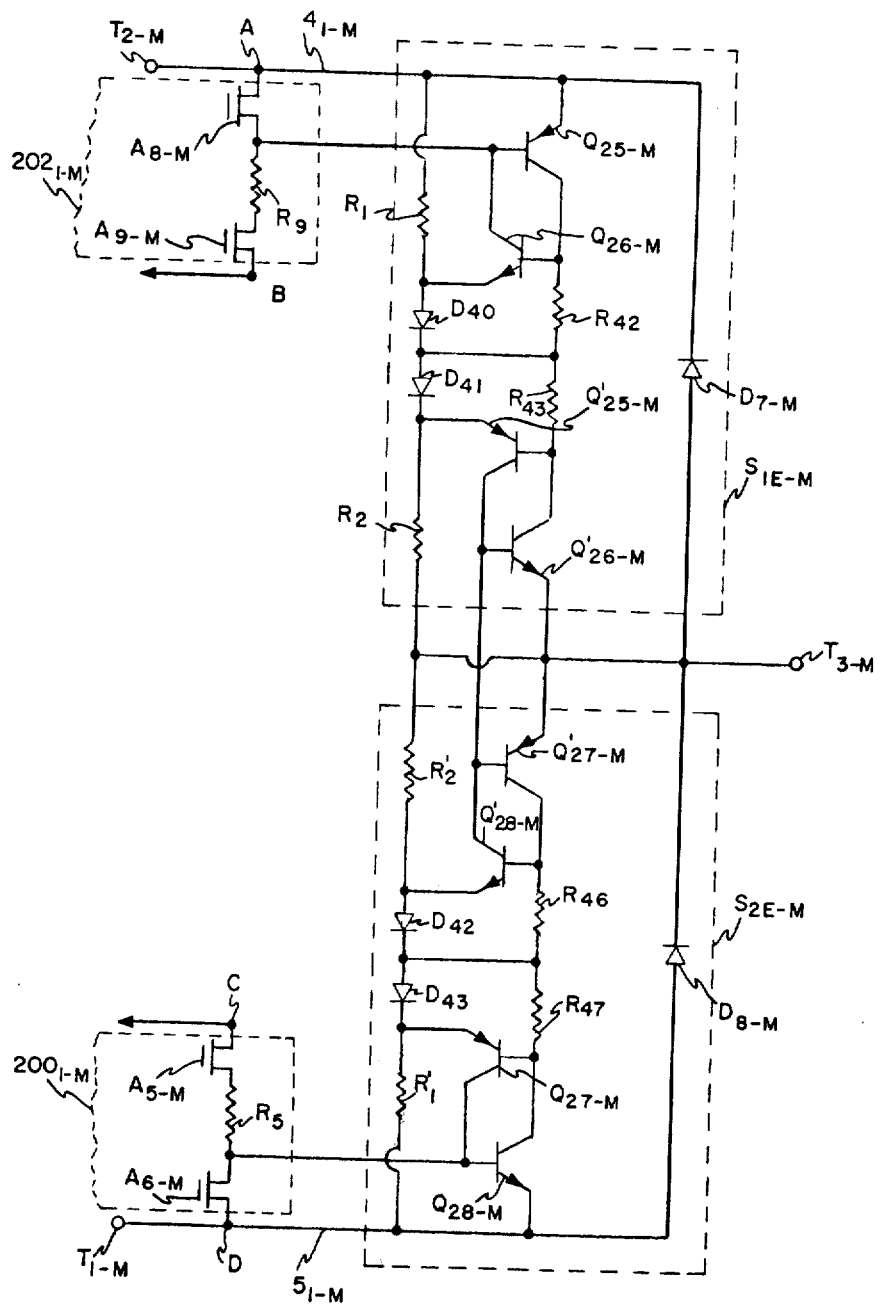
FIG. 11 shows a modification like the modification of FIG. 9, except that the SCR-mode semiconductors are stacked to withstand a high voltage output from the stage.

For uses requiring high voltage and high current, the circuit of FIG. 11 can be used. The switch shown at $S_{1E-M}$ in FIG. 11 comprises bipolar transistor pairs $Q_{25-M}$, $Q_{26-M}$ and $Q'_{25-M}$, $Q'_{26-M}$ connected in SCR-mode and cascade or series connected for high voltage capability. Similarly the switch shown at $S_{2E-M}$ comprises bipolar transistors $Q_{27-M}$, $Q_{28-M}$ and $Q'_{27-M}$, $Q'_{28-M}$ connected in SCRmode and cascade or series connected as transistors pairs. The series string consisting of resistors $R_1$, $R_2$, $R'_1$ and $R'_2$ and diodes $D_{40}$, $D_{41}$, $D_{42}$ and $D_{43}$ provide the necessary current paths and bias voltages to the switch transistors. The operation of the circuit is similar to that of FIG. 3: when the state of the associated bistable memory and control circuit is such that the transistors $A_{8-M}$ and $A_{5-M}$ are OFF, $A_{9-M}$ and $A_{6-M}$ are ON, the switch $S_{1E-M}$ is conducting and the switch $S_{2E-M}$ is non-conducting; when the transistors $A_{8-M}$ and $A_{5-M}$ are ON, $A_{9-M}$ and $A_{6-M}$ are OFF, the switch $S_{1E-M}$ is non-conducting and the switch $S_{2E-M}$ is conducting. Resistors $R_{42}$, $R_{43}$, $R_{46}$ and $R_{47}$ perform voltage division functions.

Figure 12:
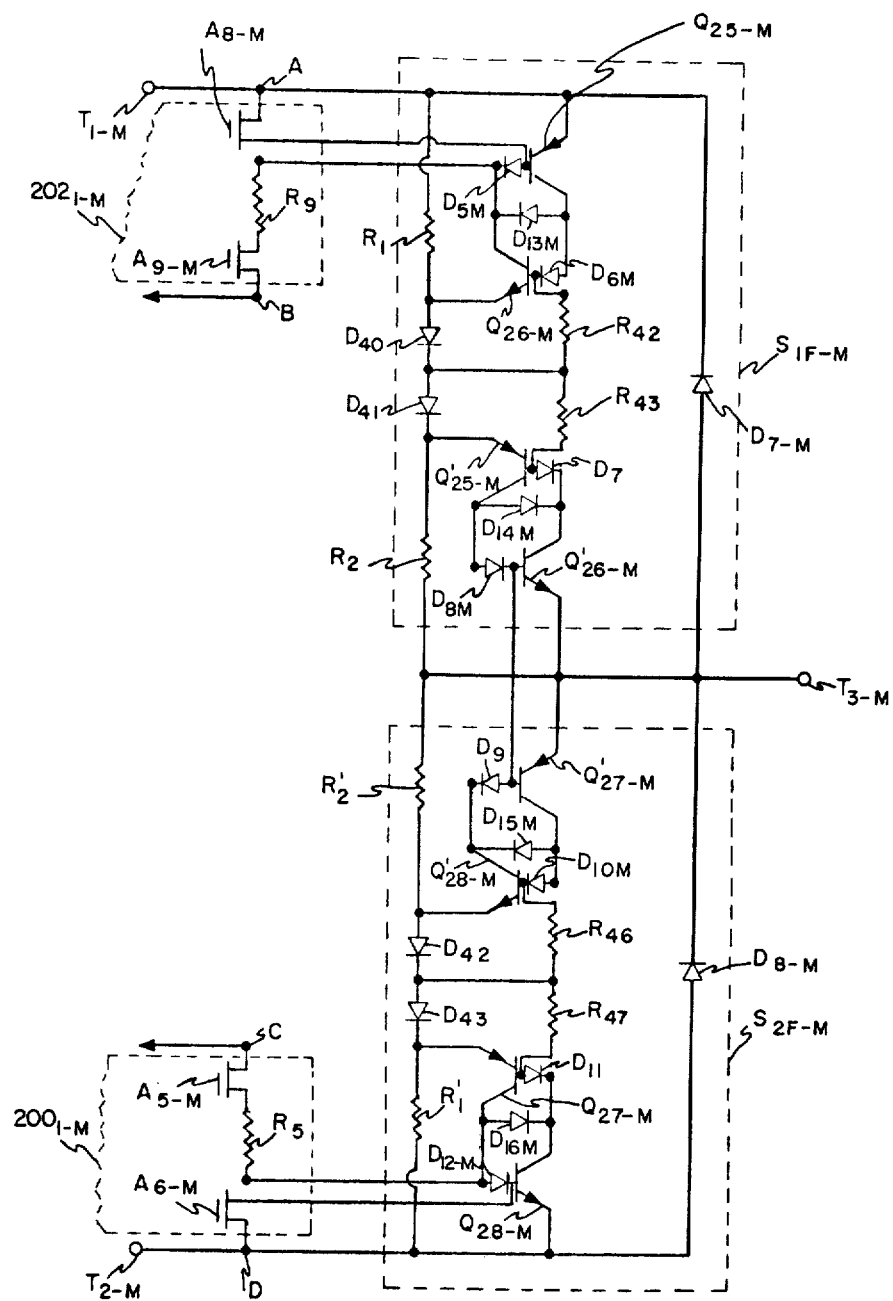
FIG. 12 shows a modification like the modification of FIG. 10, except that the SCR-mode semiconductors are stacked to withstand a high voltage output from the stage.

FIG. 12 shows the schematic of a circuit which is similar to that of FIG. 11; however, the circuit FIG. 12 has the capability of fast switching. This is possible because of the added back clamping circuitry, i.e., diodes $D_{5M}$ through $D_{12M}$ (connected in the base inputs of transistors $Q_{25-M}$, $Q_{26-M}$, $Q'_{25-M}$, etc.) and diodes $D_{13M}$ through $D_{16M}$ (shunting the collector and base inputs of the associated transistor-pairs) constitute the back clamp circuit, which ensures fast control of the state of the switching transistors. The overall operation of the unsaturated SCR-mode circuit of FIG. 12 is the same as that of the previously explained saturated SCR-mode in FIG. 11.

Figure 6:
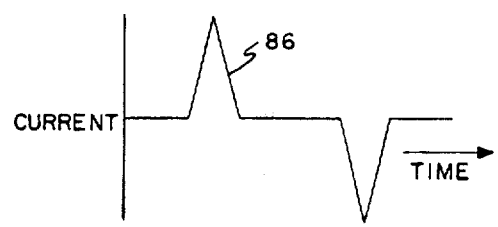
FIG. 6 is a current vs. time curve for a highly capacitive load which may be connected to the output of the system of FIG. 1.

A high capacitive load (such as, for example, a load having the current characteristics shown at 86 in FIG. 6) needs a high initial charging current. To meet this requirement, the switching circuits are modified to provide the switches shown at $S_{1G-M}$ and $S_{2G-M}$ in FIG. 13. The switches $S_{1G-M}$ and $S_{2G-M}$ respectively comprise semiconductor controlled rectifiers $SCR_1$ and $SCR_2$ to supply the initial high electric current surge for charging a large load capacitance 34'. The rectifier $SCR_1$ carries the transient current when the switch $S_{1G-M}$ turns ON the rectifier $SCR_2$ carries the transient current when the switch $S_{2G-M}$ is activated. The current through the load resistance represented by $R_{34}$ is supplied by $Q_{9-M}$ and $Q_{10-M}$ respectively when switches $S_{1G-M}$ and $S_{2G-M}$ are ON. The operation of the circuit of FIG. 13 is described in the next paragraph.

Figure 13:
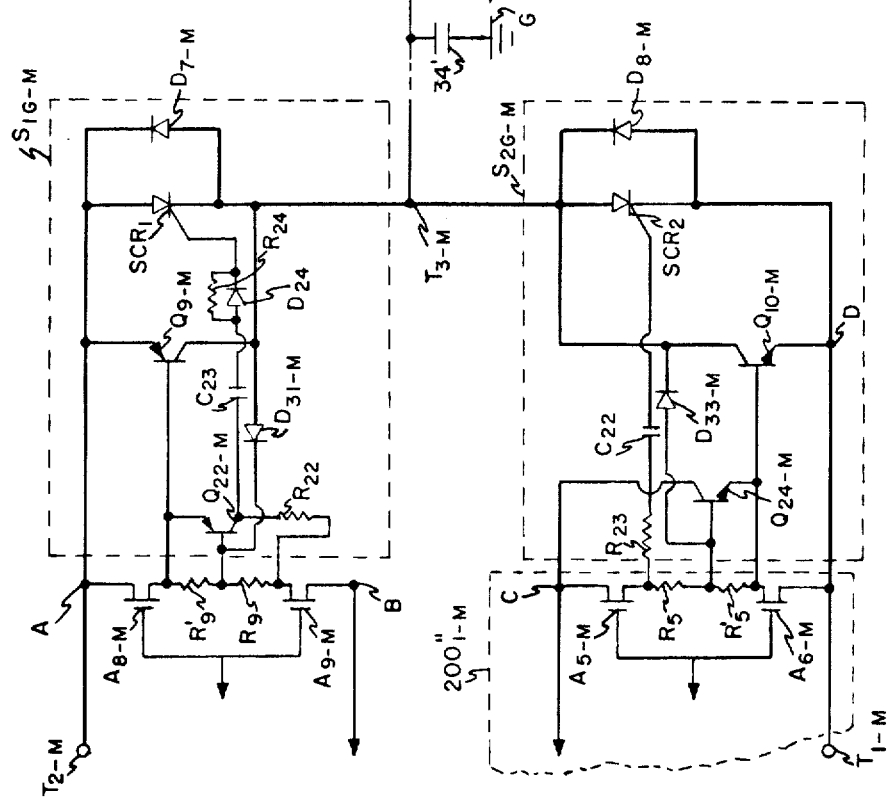
FIG. 13 shows a further modification of the switching circuits wherein the bipolar output transistors in the switching circuits of FIG. 3 are replaced by semiconductor controlled rectifiers.

For a particular setting of the associated bistable memory and control circuit designated $200''_{1-M}$ in FIG. 13, the mosfet transistors $A_{8-M}$ and $A_{5-M}$ are OFF and $A_{9-M}$ and $A_{6-M}$ are ON. When the transistor $A_{8-M}$ is OFF, a base-emitter voltage appears at turning on the transistor $Q_{22-M}$ which turns ON the transistor $Q_{9-M}$. The positive-going wave-form at the emitter of the transistor $Q_{22-M}$ makes available through a capacitor $C_{23}$ and diode $D_{24}$ are gate votage to trigger the $SCR_1$ ON and instantly supply the large spike of current needed for charging the load capacitance 34'; after the large spike of current the steady state value required by $R_{34}$ is supplied by $Q_{9-M}$; and therefore, the rectifier $SCR_1$ is allowed to turn OFF (because the voltage across the rectifier $SCR_1$ is too small to allow it to remain ON). Thus, the switch $S_{1G-M}$ is in the ON state (i.e., conducting) and the load terminal $T_{3-M}$ is connected to the terminal $T_{2-M}$. Because the transistor $A_{5-M}$ is OFF and is coupled via a trigger capacitor $C_{22}$ to the gate of the rectifier $SCR_2$, it keeps the gate voltage of the rectifier $SCR_2$ low, and the rectifier $SCR_2$ is OFF. Since the transistor $A_{6-M}$ is ON, no base-emitter voltage is available for the transistors $Q_{10-M}$ and it is OFF, as is, also, the transistor $Q_{24-M}$. Therefore the switch $S_{2G-M}$ is in the OFF state. When the memory and control circuit $200''_{1-M}$ is triggered, the mosfet transistors $A_{8-M}$, $A_{9-M}$, $A_{5-M}$, $A_{6-M}$ change states so the transistor $Q_{9-M}$ of $S_{1G-M}$ is turned OFF and $S_{2G-M}$ is turned ON. The resistors shown at $R'_5$ and $R'_9$ in FIG. 13 serve as emitter-base by-pass resistors for the transistors $Q_{24-M}$ and $Q_{22-M}$, respectively. A resistor $R_{24}$ is placed in parallel with the diode $D_{24}$ to recharge the capacitor $C_{23}$. A resistor $R_{22}$ is the collector resistor for the transistor $Q_{22-M}$. A resistor $R_{23}$ and a capacitor $C_{22}$ serve to isolate $SCR_2$ from $A_{5-M}$.

Figure 16:
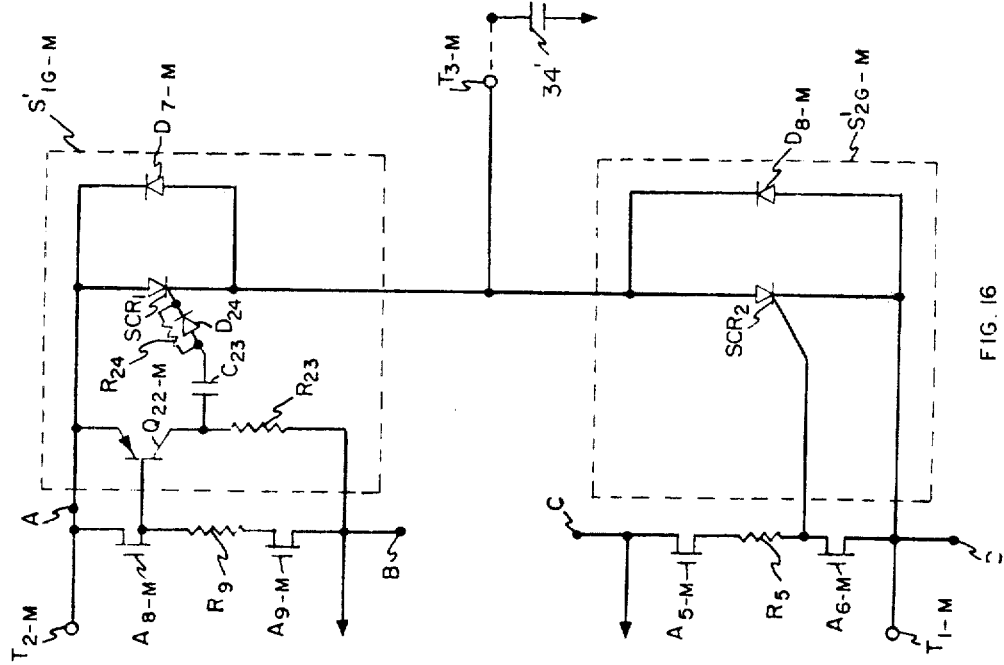
FIG. 16 shows schematically a modification of the semiconductor controlled rectifier switching circuits of FIG. 13.

Modified SCR switches $S'_{1G-M}$ and $S'_{2G-M}$ are shown in FIG. 16. The switch $S'_{1G-M}$ comprises the rectifier $SCR_1$, the diode $D_{7-M}$, the low-power, bipolar transistor $Q_{22-M}$; the trigger capacitor $C_{23}$, the resistors $R_{23}$ and $R_{24}$ and the diode $D_{24}$ perform a like function to the same elements in FIG. 13. The switch $S'_{2G-M}$ comprises the rectifier $SCR_2$ and the diode $D_{4-M}$, the gate of the controlled rectifier $SCR_2$ being connected across the output of the transistor $A_{6-M}$. This output stage configuration is used to drive capacitive-only loads.

Figure 14:
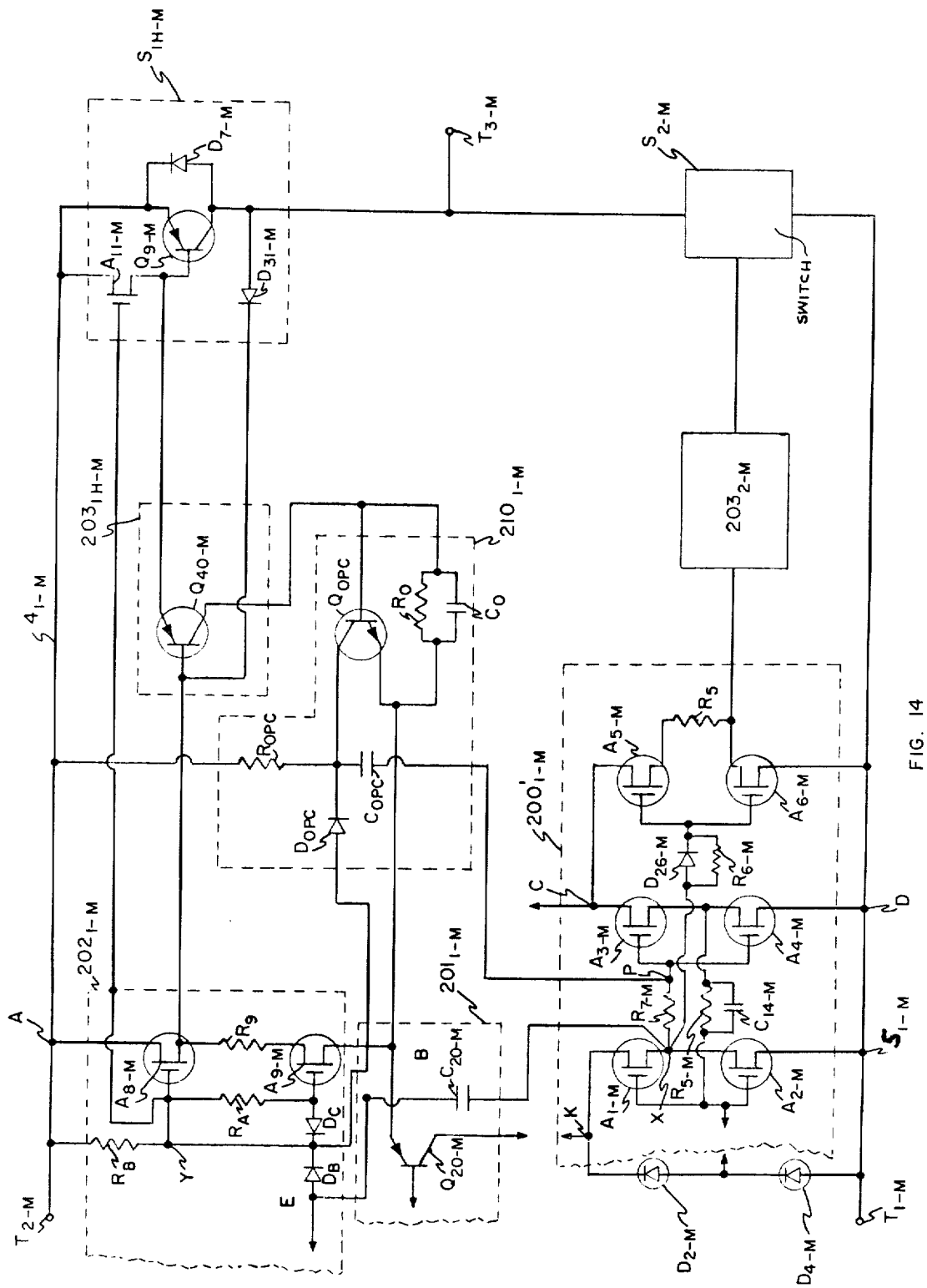
FIG. 14 shows schematically a part of a stage like the stage of FIG. 3, but including an overload protection circuit connected as part of the stage.
Figure 17:
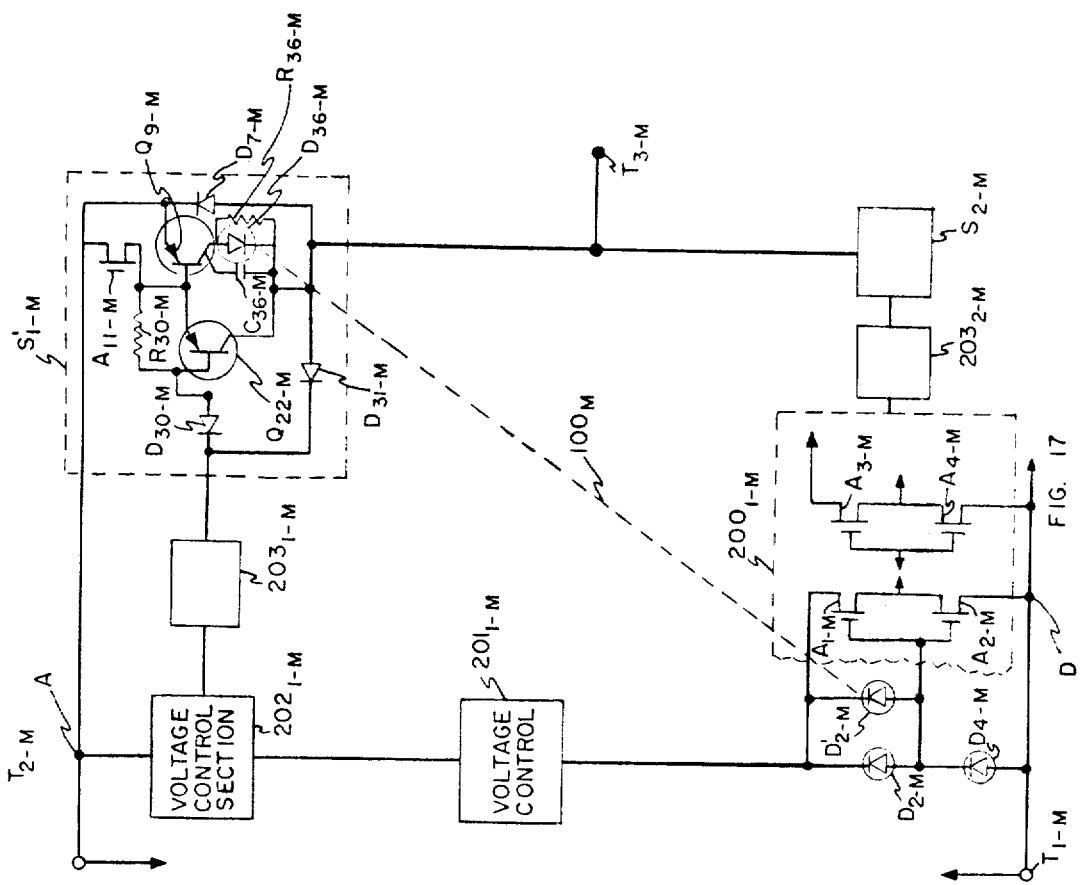
FIG. 17 shows schematically a part of a stage like the stage of FIG. 3, but including an overload protection arrangement (which differs from the overload circuit of FIG. 14) connected as part of the stage.

The circuit of FIG. 14 shows an arrangement which includes a network $210_{1-M}$ connected to protect against an overload condition, i.e., to change the state of the bistable memory and control circuit labeled $200'_{1-M}$, such that the stage M is triggered to the OFF condition when overloaded. The other stages have similar overload protection circuitry so that the complete system goes to OFF in this situation. The term "OFF" in this context denotes a situation wherein a dangerous power condition cannot exist for processing positive voltages as described herein; in this situation the $S_1$ switches (i.e., the upper switching circuits herein) are open or non-conducting and the $S_2$ switches (i.e., the lower switching circuits herein) are closed or conducting. It is appreciated that for negative voltage loads the opposite state would be used. In the circuit of FIG. 14 (or of later-discussed FIG. 17), provision can be made in the control 38 of FIG. 1 to effect automatic recycling indefinitely or for a limited number of recycles. The overload protection circuitry of FIG. 14 is added to the system 101C. Whenever any short-circuit at the load terminal $T_{3-M}$ occurs, the overload protection circuit comes into operation and controls the state of the bistable memory and control circuit $200'_{1-M}$ thereby turning OFF the $S_1$ switch which in FIG. 14 is labeled $S_{1H-M}$ (the switch $S_{2-M}$ need not be changed).

The protection circuit $210_{1-M}$ of FIG. 14 comprises a bipolar transistor $Q_{opc}$, an intergrating network $R_oC_o$, a diode $D_{opc}$, a capacitor $C_{opc}$ and a resistance $R_{opc}$, which are connected as shown. (There is a small change in the bistable memory and control circuit, $200'_{1-M}$ in FIG. 14, in that a resistor $R_{7-M}$ is added between the point X and a point P which is the gate input to the transistor pair $A_{3-M}$-$A_{4-M}$; and the anode side of $D_{26-M}$ remains connected to the point X.) Under normal operating conditions, the transistor $Q_{9-M}$ (in the switch $S_{1H-M}$) is ON, the transistor $Q_{opc}$ is OFF and the states of the mosfet transistors are such that $A_{8-M}$ is OFF, $A_{9-M}$ is ON, $A_{1-M}$ is ON, $A_{2-M}$ is OFF, $A_{3-M}$ is OFF and $A_{4-M}$ is ON. However, in the event of a short circuit, a heavy current will be demanded through the collector of the transistor $Q_{9-M}$ which will cause the diode $D_{31-M}$ to become back biased which, in turn, causes a substantial increase in the emitter current of a transistor $Q_{40-M}$ and, therefore, the collector current in the transistor $Q_{40-M}$ which charges the $R_oC_o$ network. The integrated voltage transiently turns ON the transistor $Q_{opc}$ such that, via trigger capacitor $C_{opc}$, the previous state of the associated bistable memory and control circuit $200'_{1-M}$ is inverted, whereby the switching circuit $S_{1H-M}$ is turned OFF. This turning OFF process is expedited by the diode $D_{opc}$ which transmits the down voltage change in the collector of the transistor $Q_{opc}$ to the gates (point Y) of the transistors $A_{8-M}$ and $A_{9-M}$ which are turned to the ON and OFF states, respectively. By modifying the time constant of the $R_oC_o$ network, acceptable overload durations can be maintained.

Another way of protecting stage M from overload conditions is by using light-emitting diodes and light-sensitive diodes in an optically coupled arrangement. For this purpose a light-emitting diode $D_{36-M}$ and parallel connected capacitor $C_{36-M}$ and a resistor $R_{36-M}$ are inserted in the collector of the transistor $Q_{9-M}$ of the switching stage $S'_{1-M}$ shown in FIG. 17. During normal operation the transistor $Q_{9-M}$ is ON, mosfet transistor $A_{1-M}$ is ON, $A_{2-M}$ is OFF, $A_{3-M}$ is OFF and $A_{4-M}$ is ON. Under overload conditions at the terminal $T_{3-M}$, the current through the light emitting diode $D_{36-M}$ crosses a threshold value such that it emits enough light which is coupled as indicated by the dotted line shown at $100_M$) to a diode $D'_{2-M}$ to change the state of the bistable memory and control circuit $200_{1-M}$.

Figure 15:
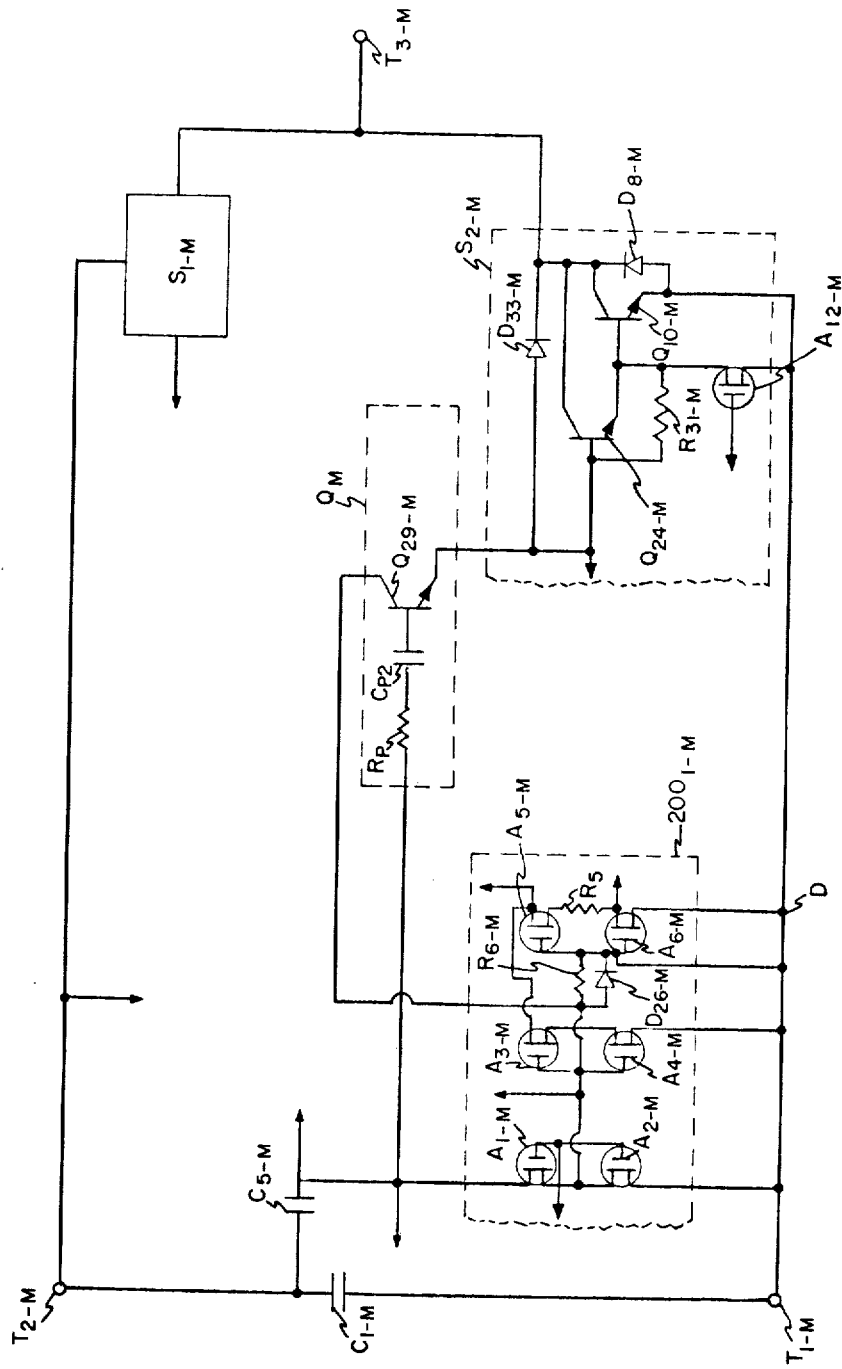
FIG. 15 shows schematically a part of a stage like the stage of FIG. 3, but including a circuit adapted to set the stage to a particular, predetermined initial stage.

In FIG. 15 there is shown, a "power-on" network $Q_M$ connected to the bistable memory and control circuit $200_{1-M}$ and operable to place the stage M in the desired initial state (i.e., $T_{1-M}$ connected to the terminal $T_{3-M}$) when the stage is energized. The other stages each has a similar network so that the complete system 101C can be placed in the desired initial state, as discussed in the next paragraph.

It is important when the electric system 101C is supplied with electrical power (i.e., turned ON), that the switches $S_{1-M}$ and $S_{2-M}$ in all their variations follow a pre-determined "State" pattern even before any logic is applied to the bistable memory and control unit $200_{1-M}$. This is possible by adding the transient-coupled transistor circuit or power-ON network $Q_M$ into each stage of the system 101C, as shown in FIG. 15. The operation of the power-ON network is now explained. When the electric power system is turned On, the initial transient through the elements shown at $C_{5-M}$, $R_p$, and $C_{p2}$ momentarily provides a base-emitter voltage for a transistor $Q_{29-M}$ which is therefore turned ON. The collector voltage transient of the transistor $Q_{29-M}$ sets the state of the bistable memory and control circuit $200_{1-M}$ such that the transistors $A_{1-M}$, $A_{4-M}$ and $A_{6-M}$ are OFF and transistors $A_{2-M}$, $A_{3-M}$ and $A_{5-M}$ are ON. Thus, the bistable memory and control circuit $200_{1-M}$ is in the proper state such that the switch $S_{2-M}$ conducts. Turning the switch $S_{2-M}$ ON is aided by the presence of the emitter current from the transistor $Q_{29-M}$. It should be evident at this juncture, in the light of the explanation previously given herein and in the prior application, that the electrical system 101C is "turned ON" when an input power means 31 in FIG. 1 is connected to the terminal $T_{2-1}$ and thence to $T_{2-2} \ldots T_{2-N}$. It should also be appreciated that the terminals $T_{2-1} \ldots T_{2-M} \ldots T_{2-N}$ are positive (+) in the system described and the terminals $T_{1-1} \ldots T_{1-M} \ldots T_{1-N}$ are negative (−), but that the reverse polarity can be employed by using complementary circuitry to that shown. At any rate, the power ON network $Q_M$ in the system shown is coupled to the positive terminal $T_{2-M}$ through the capacitor $C_{5-M}$, as shown; the collector of the transistor $Q_{29-M}$ is connected to the gates of the transistors $A_{5-M}$ and $A_{6-M}$ through the diode $D_{26-M}$; and the emitter of the transistor $Q_{29-M}$ is connected to the base of the transistor $Q_{24-M}$.

Figure 18:
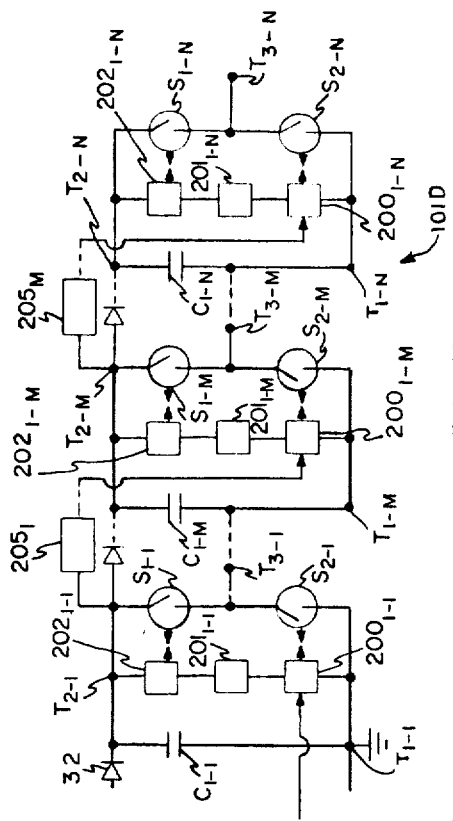
FIG. 18 shows schematically a modification of the system of FIG. 1 to illustrate avalanche-mode of operation.
Figure 19:
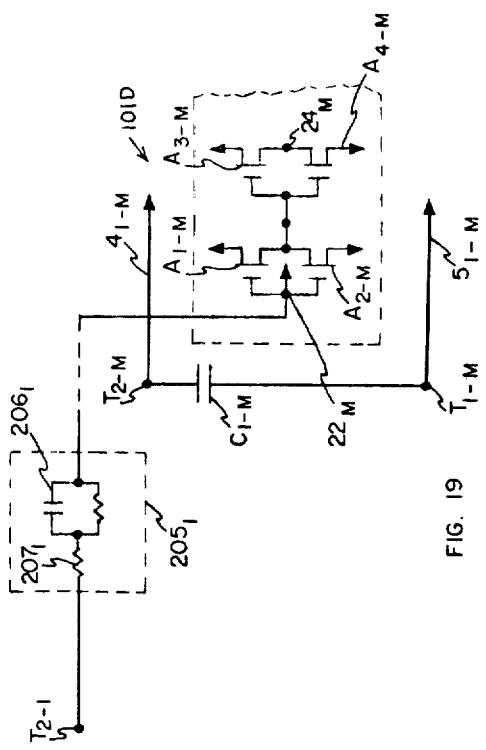
FIG. 19 shows schematically, and in some detail, a part of the system of FIG. 18.

In the previously discussed system 101C, the individual stages are triggered by light-sensitive diodes or the like which change the state of the bistable memory and control circuits $200_{1-1} \ldots$ . In the system shown at 101D and discussed in this paragraph with reference to FIGS. 18 and 19, one stage only need be triggered and this can be done by the same type of light triggering as previously disclosed. The remaining stages are triggered in what is termed herein an "avalanche mode," as now described. In FIG. 18 there is shown a plurality of coupling networks $205_1 \ldots 205_M \ldots$ connected between the $T_2$ terminal of one stage and the bistable memory and control circuit of the next succeeding stage (e.g., the coupling network $205_1$ is connected from the terminal $T_{2-1}$ to the point $22_M$ of the bistable memory and control circuit of stage 2, etc., but for present purposes, the network $205_1$ is shown connected to the bistable memory and control unit $200_{1-M}$). It is assumed for this explanation that the condition of the first bistable memory and control circuit $200_{1-1}$ is set by diodes, like the diodes $D_{2-M}$ and $D_{4-M}$, such that the switch $S_{1-1}$ is closed and the terminal $T_{3-1}$ is connected to the positive (+) terminal $T_{2-1}$. At this juncture, the mosfet transistor $A_{1-M}$ in FIG. 19 is turned ON, $A_{2-M}$ is turned OFF, $A_{3-M}$ is turned OFF, and $A_{4-M}$ is turned ON. The foregoing states of transistors $A_{1-M} \ldots$ cause the switch $S_{1-M}$ to conduct and $S_{2-M}$ to be non-conducting. This then causes a change of state of the subsequent memory and control circuits $\ldots 200_{1-N}$. The foregoing change in state, as shown in FIG. 19, is accomplished by connecting the coupling network output of one stage to the gate inputs of the next succeeding bistable memory and control circuit. In this manner the triggering of the stage 1 triggers stage 2 which triggers stage 3, etc., to stage N. Coupling is effected by an RC network $206_1$ and series resistor $207_1$. When the bistable memory and control circuit $200_{1-1}$ changes state so that the switch $S_{1-1}$ is opened and the switch $S_{2-1}$ is closed, all the succeeding stages, in order, change state in similar fashion. Again, only so much of the circuitry as is needed for the present explanation is shown in FIGS. 18 and 19. The stages 1 ... N in FIGS. 18 and 19, of course, each has the usual voltage control section and voltage coupler.

The electric systems 101E, 101F, 101G, and 101H in FIGS. 20, 22, 24 and 26, respectively, are modifications of the previously discussed systems 101C. In these figures, again, to simplify this explanation, three stages only of an N-stage system are shown. These systems all employ bistable memory and control circuits like the circuits $200_{1-1}$ in FIG. 3. The blocks designated hv in these figures, like the boxes labeled hv (i.e., $215_{1-1} \ldots$) in FIG. 1, each contains solid-state optical couplers. There follows first a brief explanation of the circuitry of FIG. 20; as before, some of the elements have the same or similar indicia to that used in previous figures.

Figures 20, 21:
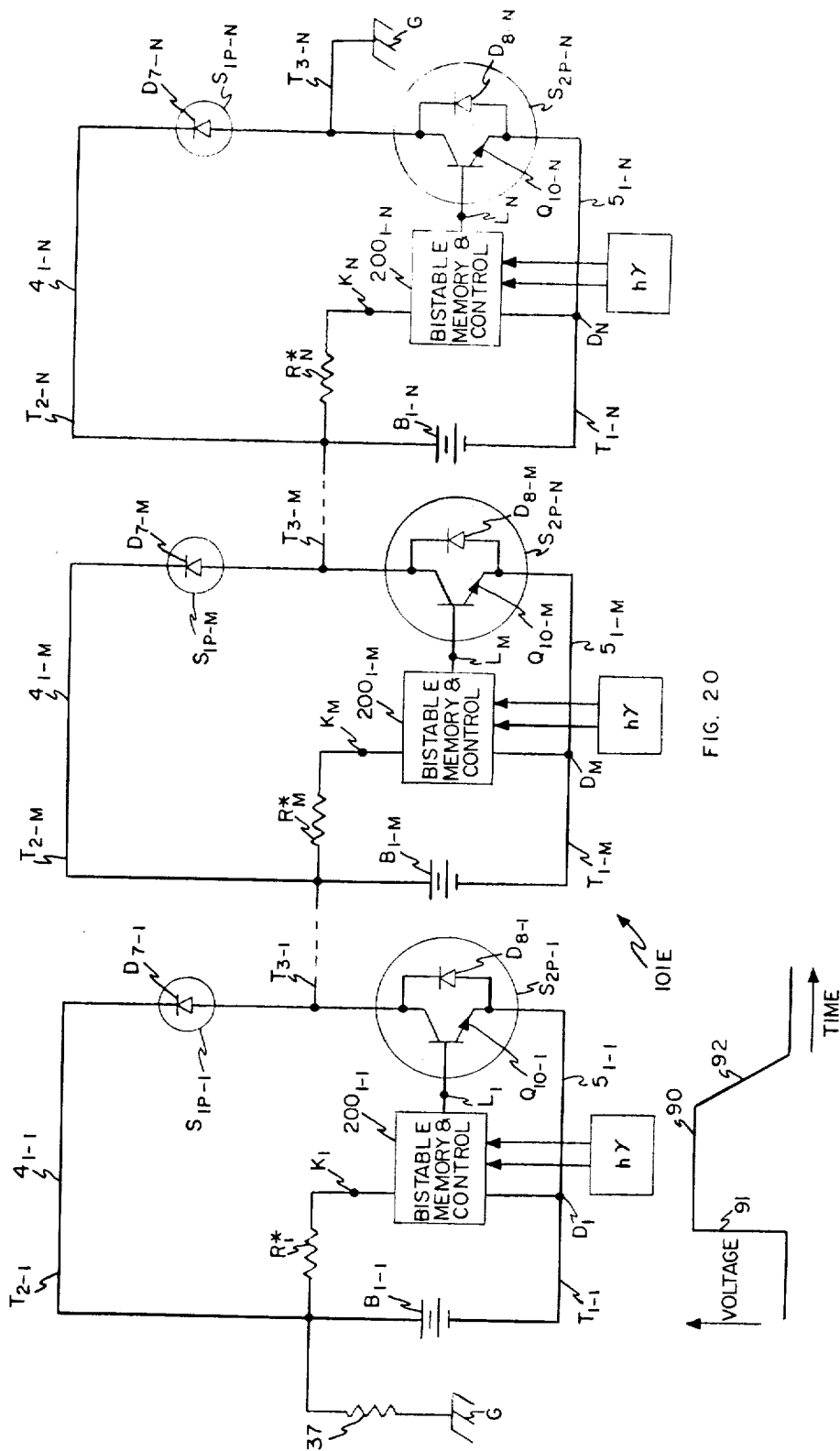

The bistable memory and control circuits $200_{1-1} \ldots$ in FIG. 20 control respective switches $S_{2P-1} \ldots$ which are bilateral and each again contains a transistor $Q_{10-1} \ldots$ and a diode $D_{8-1} \ldots$ . The switches shown at $S_{1P-1} \ldots$ are unilateral and each contains only a diode $D_{7-1} \ldots$ . The energy storage means in this configuration as well as the further figures are labeled $B_{1-1} \ldots$ . The bistable memory and control circuits $200_{1-1} \ldots$ are connected in parallel with the energy storage means $B_{1-1}$ through series resistors $R^*_1 \ldots$ . Points $D_1 \ldots, K_1 \ldots, L_1 \ldots$ correspond to points D, K and L, respectively, in FIG. 3. With $T_{3-N}$ grounded as shown and the load 37 connected between $T_{2-1}$ and ground as also shown, if the stages are all switched to the condition wherein the transistors $Q_{10-1} \ldots$ are ON, a pulse 90 in FIG. 21 results. The pulse 90 has a fast-rising leading edge 91. When the transistors $Q_{10-1} \ldots$ are turned OFF, the potential across the load returns to zero in a slow falling manner as represented by the slow-falling trailing edge 92 of the pulse 90. The purpose of this simplified system 101E, as opposed to the previously discussed systems, is to generate a waveform 90 with fewer electrical elements than in the PSC 101C, for example. This simplified circuit is useful in some situations where a sharp leading edge and a relatively slow falling edge is required or can be tolerated.

In the system 101F in FIG. 22, the terminal $T_{2-1}$ is grounded and the load 37 is connected between the terminal $T_{3-N}$ and ground to give the fast-falling, slow-rising waveform shown at 93 in FIG. 23. The $S_1$ switches in this figure comprise diodes $D_{7-1}$ . . . and the $S_2$ switches comprises transistors $Q_{10-1}$ . . . .

The system 101G in FIG. 24 represents a slight modification of the system of FIG. 22 in that each of the diodes $D_{7-1}$ . . . has a resistor $R_{X-1}$ . . . connected in parallel across the associated diode to provide the slow-rising, fast-falling pulse shown at 94 in FIG. 25. In the system 101G the load is shown as a principally capacitive load 34, connected between the terminal $T_{3-N}$ and ground, and each of the batteries shown is connected to the $T_3$ terminal of the previous stage at the negative side of the battery, except the first stage wherein the terminal $T_{1-1}$ is grounded.

Figures 26, 27:
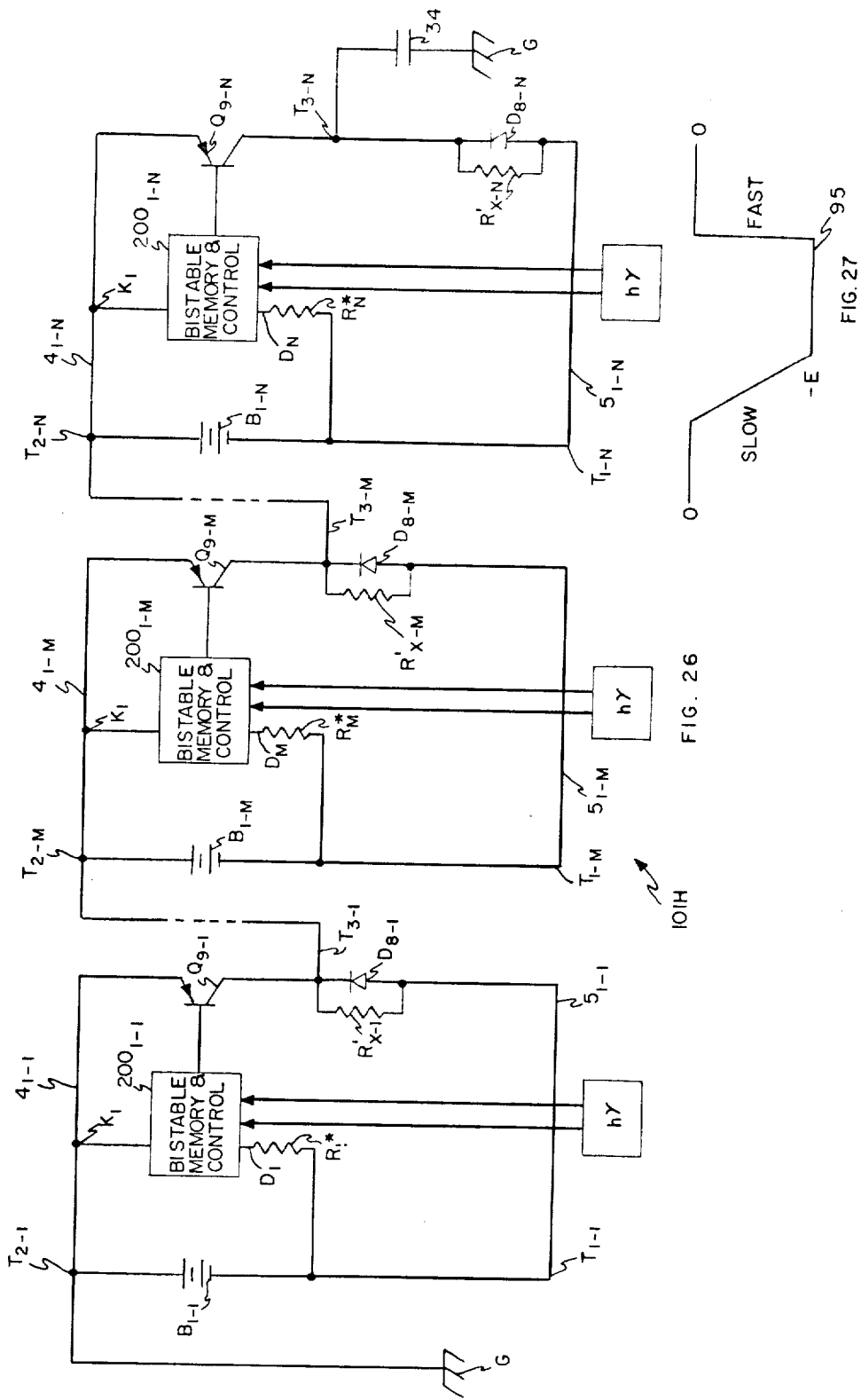

The system 101H in FIG. 26 is adapted to provide the negative-going waveform numbered 95 in FIG. 27. This system is quite similar to the system 101G except that the transistor in the $S_2$ switches is replaced by a diode and the diode in the $S_1$ switches is replaced by a transistor. The transistors $Q_{9-1}$ . . . in FIG. 26 are p-n-p rather than the n-p-n transistors $Q_{10-1}$ . . . in FIG. 24. Resistors $R'_{X-1}$ . . . in parallel with the diodes $D_{8-1}$ . . . serve the same functions as do the resistors $R_{X-1}$ . . . in FIG. 24. Also, in FIG. 26, the terminals $T_{2-1}$ . . . are connected to $K_1$ . . . and the resistors $R^*_1$ . . . are connected between the negative side of the batteries $B_{1-1}$ . . . and the points designated $D_1$ . . . which are identical to the point D input to the unit $200_{1-1}$ in FIG. 3.

In the systems of FIGS. 20, 22, 24 and 26, the batteries $B_{1-1}$ . . . can be replaced by solar batteries, as before. In some situations the diode $D_{8-1}$ in FIG. 20 need not be used as will be appreciated by its omission from the circuitry of FIGS. 22, 24 and 26. The systems 101E, 101F, 101G and 101H can be avalanche triggered in a manner similar to the system 101D in FIG. 18. For the purpose of explanation, the system 101G only in FIG. 24 need be described for this mode. Avalanche triggering of the system 101G can be accomplished by connecting a network like the network $205_1$ (see FIGS. 18 and 19) between the $T_{2-1}$ terminal and the connection point $22_M$ of the of the unit $200_{1-M}$ of the stage M etc. to stage N, i.e., the connection point in the bistable memory and control circuit of the next succeeding stage corresponding to the point 22M in FIGS. 3 and 19.

From what has been said, it should be apparent that the complexity or the lack thereof in the circuitry described in the foregoing specification depends upon the detailed requirements of the desired output waveform. Also, the electric power system herein described (as is the case of the system in said parent application) can be connected in parallel to increase electric current capability and can be connected in a polyphase configuration.

The systems described herein, as compared to the systems described in said application, have, among other things, the advantage of being more simple and yet more flexible than the prior circuit, as well as being even more efficient. Thus, for example, the present system allows the series mode and the parallel mode, it allows use of SCR outputs, modular packaging, etc.

In the foregoing explanation, the terminals $T_{2-1}$ . . $T_{2-N}$ are shown connected to the positive (+) side of the input power means 31, and the terminals $T_{1-1}$ . . . $T_{1-N}$ are shown connected to the minus (or ground) side. It will be appreciated that the circuitry in the electric systems shown is made up of complementary type elements and that the terminals $T_{2-1}$ . . . $T_{2-N}$ can be connected to the minus (−) side of the input power means 31 with appropriate changes in system elements. Also, the "up" conversion possibilities only are explained herein; but when it is recalled that essentially what is done here is to disclose modification of the circuitry of FIG. 2 and, since the circuit of FIG. 2 is usable in all the variations of the disclosure in the parent application, including down conversion, it will be appreciated that the modifications of stage M herein can be similarly used. One of the advantages of the systems 101C etc. is the possibility of using standard commercially available elements; in particular the function of the unit $200_{1-M}$ can be performed by a chip, as can also the function of section $202_{1-M}$, not all the element available on such chip being used for any particular system 101C. This is possible because changes in output of current and voltage can be effected in the various various schemes outlined by making appropriate changes in the voltage coupler $201_{1-M}$ at the input side of the stage M and making appropriate changes, as explained, in the switch circuits $S_{1-M}$ and $S_{2-M}$ etc. at the output side thereof. The $C_1$ capacitors in the system of FIG. 1 are charged from the power means 31 through a diode 32 and thence diodes $D_{5-1}$ . . . when the $S_2$ switches are closed, as explained in said application, and the $C_1$ capacitors are series connected to the load 37 when the $S_1$ switches are closed. Series diodes 33 prevent reverse current into the system 101C from the load 37 and a capacitance 34.

Some typical circuit elements for a stage having an output of 600 volts at 50 milliamperes at the $T_3$ terminal are: $Q_{9-M}$ and $Q_{22-M}$ (Trsp-805); $Q_{20-M}$ (2N3965 of Fairchild); $Z_{1-M}$ and $Z_{3-M}$ (1N-5235 of Motorola); $200_{1-M}$ and $202_{1-M}$ (CD-4007 AD integrated circuit of RCA except that the zener diodes are not included in the integrated circuit); and Z* is made up of three diodes, two are 1N992 and one is 1N990.

Further modifications of the invention herein described will occur to persons skilled in the art and all such modifications are deemed to be within the spirit and scope of the invention as defined by the appended claims.

What is claimed is:

1. An electric system that comprises a plurality of stages connected in cascade, each stage including, in combination, supply voltage means connected along two alternate paths to an electric terminal of the stage, semiconductor switch means connected between the supply voltage means and the terminal and operable to determine which of the two paths is conductive thereby to determine which side of the supply voltage means is connected to the terminal, a light-actuated bistable memory and control circuit connected to control the switch means, said bistable memory and control circuit having a bistable portion, one state of the bistable portion of the circuit acting to render conductive one of said paths and the other state of the bistable portion of the circuit acting to render conductive the other of said paths as alternate conditions of system operation, a voltage control section that includes a plurality of field effect transistors and a voltage coupler connected between the bistable memory and control circuit and the voltage control section.

2. An electric system as claimed in claim 1 in which the field effect transistors are mosfet transistors.

3. An electric system as claimed in claim 1 that has a feedback network connected between said terminal and the bistable memory and control circuit to change the state of the bistable memory and control circuit under conditions of overload at said terminal.

4. An electric system as claimed in claim 3 in which the feedback network is an optically coupled path from a light-emitting diode in series with the terminal.

5. An electric system as claimed in claim 1 that further includes a power-on network connected to the bistable memory and control circuit of each stage and operable to place the system in the desired initial state.

6. An electric system as claimed in claim 1 in which the semiconductor switch means comprises two semiconductor switching circuits, one in each of said paths.

7. An electric system as claimed in claim 6 in which one of said semiconductor switching circuits is bilateral and the other of said semiconductor switching circuits is unilateral.

8. An electric system as claimed in claim 1 having three floating reference voltage means which derive reference voltages from said supply voltage means, the first of the floating reference voltage means being connected to energize the bistable memory and control circuit, the second of the floating reference voltage means being connected to energize the voltage coupler, and the third of the floating reference voltage means being connected to energize the voltage control section.

9. An electric system as claimed in claim 8 in which the first floating reference voltage means comprises a first zener diode, the second floating reference voltage means comprises a second zener diode and resistor, in series, and the third floating reference voltage means comprises a third zener diode, the three zener diodes and the resistor being serially connected as a series string across the supply voltage means.

10. An electric system as claimed in claim 1 in which the bistable memory and control circuit comprises six mosfet transistors, four of which make up said bistable portion and the remaining two of which make up a control portion, the latter being driven by a signal from the bistable portion thereof.

11. An electric system as claimed in claim 1 in which the voltage control section comprises a pair of mosfet transistors.

12. An electric system as claimed in claim 1 in which the voltage coupler comprises a p-n-p transistor and an n-p-n transistor connected to couple the voltage control section and the memory and control circuit, and a trigger capacitor connected from said bistable portion to trigger said voltage control section, the p-n-p transistor and n-p-n transistor performing d-c coupling and the trigger capacitor performing a-c coupling.

13. A system as claimed in claim 1 in which the semiconductor switch means comprises two switching circuits, each of which includes a plurality of transistors, diodes and resistances in combination.

14. A system as claimed in claim 1 in which the switch means comprises a switching circuit in each path, one of the switching circuits comprising a pair of high-voltage, high-current p-n-p transistors in a Darlington-pair connection and additional components arranged to keep the Darlington pair out of saturation and the other of the switching circuits comprising a pair of high-voltage, high-current n-p-n transistors in a further Darlington-pair connection and additional components to keep the further Darlington pair out of saturation.

15. A system as claimed in claim 14 that includes a low-voltage silicon diode connected in series with the input to the first-named Darlington-pair and a high-voltage silicon diode connected from the collector of the first-named Darlington-pair to the input thereof and that further includes a low-voltage silicon diode connected in series with the second-named Darlington pair and a high-voltage silicon diode connected from the collector of the second-named Darlington-pair ot the input thereof.

16. A system as claimed in claim 15 that includes a pre-amplifier connected as input to each set of the switching circuits.

17. A system as claimed in claim 17 in which each pre-amplifier comprises a Darlington-pair.

18. A system as claimed in claim 1 in which the semiconductor switch means comprises two semiconductor switches, one in each of said paths, and in which each of the semiconductor switches comprises a plurality of transistors in a series mode arrangement for high-voltage.

19. A system as claimed in claim 18 having three floating reference voltage means which derive reference voltages from said supply voltage means, the first of the reference voltage means being connected to energize the bistable memory and control circuit, the second of the floating reference voltage means being connected to energize the voltage coupler, and the third of the floating reference voltage means being connected to energize the voltage control section.

20. A system as claimed in claim 19 in which the voltage coupler comprises a plurality of series mode n-p-n transistors and a p-n-p transistor connected to couple the voltage control section and the bistable memory and control circuit and a trigger capacitor connected from said bistable portion to trigger said voltage control section, the n-p-n transistors and the p-n-p transistor, in combination, performing d-c coupling and the trigger capacitor performing a-c coupling.

21. An electric system as claimed in claim 18 in which some of the transistors in each of the semiconductor switches are in a series-mode stack to provide high-voltage and which includes a plurality of stacks connected in shunt mode to provide high electric current as well.

22. An electric system as claimed in claim 1 in which the semiconductor switch means comprises two semiconductor switches, one in each of said paths, and in which each of the semiconductor switches comprises a plurality of transistors in shunt-mode for high current.

23. An electric system as claimed in claim 22 having three floating reference voltage means which derive reference voltages from said supply voltage means, the first of the floating reference voltage means being connected to energize the bistable memory and control circuit, the second of the floating reference voltage means being connected to energize the voltage coupler, and the third of the floating reference voltage means being connected to energize the voltage control section.

24. An electric system as claimed in claim 23 in which a pre-amplifier is connected between the bistable memory and control circuit and one of the semiconductor switches and in which a complementary preamplifier is connected between the voltage control section and the other of the semiconductor switches.

25. An electric system as claimed in claim 1 in which the semiconductor switch means comprises a semiconductor controlled rectifier device connected in each of said paths.

26. An electric system as claimed in claim 25 which further includes a bipolar transistor shunting each said semiconductor controlled rectifier device.

27. An electric system as claimed in claim 26 that includes additional means to protect the system from overload conditions.

28. An electric system as claimed in claim 25 that further includes bipolar transistors connected to control each said semiconductor controlled rectifier device.

29. An electric system that comprises a plurality of stages connected in cascade, each stage including, in combination, supply voltage means connected along two alternate conductive paths to an electric terminal of the stage, switch means connected between the supply voltage means and the terminal and operable to determine which of the two paths is conductive thereby to determine which side of the supply voltage means is connected to the terminal, a light-actuated bistable memory and control circuit connected to control the switch means, said light-actuated bistable memory and control circuit including a bistable portion, one state of the bistable portion of the circuit acting to render conductive one of said paths and the other state of the bistable portion of the circuit acting to render conductive the other of said paths as alternate conditions of system operation, a voltage control section, a voltage coupler connected between the bistable memory and control circuit and the voltage control section, and three floating reference voltage means which derive reference voltages from said supply voltage means, the first of the floating reference voltage means being connected to energize the bistable memory and control circuit, the second of the floating reference voltage means being connected to energize the voltage coupler, and the third of the floating reference voltage means being connected to energize the voltage control section.

30. An electric system that comprises a plurality of stages connected in cascade, each stage including, in combination, supply voltage means connected along two alternate paths to an electric terminal of the stage, semiconductor switch means connected between the supply voltage means and the terminal and operable to determine which of the two paths is conductive thereby to determine which side of the supply voltage means is connected to the terminal, a bistable memory and control circuit connected to control the switch means, said bistable memory and control circuit including a bistable portion and a control portion, one state of the bistable portion of the circuit acting to render conductive one of said paths and the other state of the bistable portion acting to render conductive the other of said paths as alternate conditions of system operation, a voltage control section that includes a plurality of field effect transistors and a voltage coupler connected between the bistable memory and control circuit and the voltage control section.

31. An electric system as claimed in claim 30 in which only one stage of the plurality of stages includes means operable to change the bistable memory and control circuit of said one stage from said one state to said other state and vice versa and in which the remaining stages of the plurality of stages change stage in an avalanche mode to the state assumed by said one stage.

32. An electric system as claimed in claim 31 in which the means operable to change the bistable memory and control circuit of said one stage from said one state to said other state and vice versa, is light actuated.

33. An electric system as claimed in claim 30 in which the semiconductor switch means comprises two semiconductor switching circuits, one in each of said paths.

34. An electric system as claimed in claim 33 in which each semiconductor switching circuit comprises bipolar transistors connected in an SCR-mode and adapted to get saturated in the active state.

35. An electric system as claimed in claim 34 having a plurality of said SCR-mode connected transistors connected in series in each semiconductor switching circuit for high voltage.

36. An electric system as claimed in claim 33 in which each semiconductor switching circuit comprises bipolar transistors connected in an SCR-mode and containing a clamping arrangement to avoid saturation.

37. An electric system as claimed in claim 36 in which each semiconductor switching circuit comprises a plurality of said SCR-mode connected transistors connected in series for high voltage capability.

38. An electric system as claimed in claim 33 in which each of the semiconductor switching circuits comprises a semiconductor controlled rectifier.

39. An electric system as claimed in claim 38 in which one of the semiconductor switching circuits includes a bipolar transistor to provide control for the semiconductor controlled rectifier in that circuit and in which the control for the semiconductor controlled rectifier in the other semiconductor switching circuit is effected directly from the control portion of the bistable memory and control circuit.

40. An electric system as claimed in claim 38 in which each of the semiconductor switching circuits further includes bipolar transistors to control the semiconductor controlled rectifier in the associated switching circuit.

41. A system as claimed in claim 33 in which one of the switching circuits comprises a pair of high-voltage, high-current p-n-p transistors in a Darlington-pair connection and additional components connected to keep the Darlington-pair out of saturation and the other of the switching circuits comprises a pair of high-voltage, high-current n-p-n transistors in a further Darlington-pair connection and additional components to keep the further Darlington pair out of saturation.

42. A system as claimed in claim 33 in which each of the semiconductor switching circuits comprises a plurality of transistors connected in a series mode arrangement for high voltage.

43. A system as claimed in claim 43 in which the voltage coupler comprises a plurality of transistors at least some of which are connected in a series mode.

44. A system as claimed in claim 43 which includes a zener diode and series resistor connected as a floating reference voltage for the voltage coupler, the zener diode being matched in voltage to the series-mode transistors in the voltage coupler.

45. A system as claimed in claim 42 in which each of the semiconductor switching circuits is bilateral, a plurality of diodes being serially connected across the plurality of serially connected transistors in each switching circuit to allow electric current to flow bilaterally therein.

46. A system as claimed in claim 33 in which each of the semiconductor switching circuits comprises a plurality of transistors connected in a shunt-mode for high current.

47. A system as claimed in claim 46 in which each of the semiconductor switching circuits is bilateral, a plurality parallel-connected diodes being connected across the shunt-mode transistors in each switching circuit to allow electric current to flow bilaterally therein.

48. A system as claimed in claim 47 in which a first pre-amplifier is connected between the bistable memory and control circuit and one of the semiconductor switching circuits and in which a second pre-amplifier is connected between the voltage control section and the other of the semiconductor switching circuits.

49. An electric system than comprises a plurality of stages connected in cascade, each stage including, in combination, supply voltage means connected along two alternate paths to an electric terminal of the stage, switch means connected between the supply voltage means and the terminal and operable to determine which of the two paths is conductive thereby to determine which side of the supply voltage means is connected to the terminal, a bistable memory and control circuit connected to control the switch means, said bistable memory and control circuit including a bistable portion, one state of the bistable portion of the circuit acting to render conductive one of said paths and the other state of the bistable portion of the circuit acting to render conductive the other of said paths as alternate conditions of system operation, a voltage control section that includes a plurality of field effect transistors and a voltage coupler connected between the bistable memory and control circuit and the voltage control section.

50. An electric system that comprises a plurality of stages connected in cascade, each stage including, in combination, supply voltage means connected along two alternate paths to an electric terminal of the stage, switch means connected between the supply voltage means and the terminal and operable to determine which of the two paths is conductive thereby to determine which side of the supply voltage means is connected to the terminal, a bistable memory and control circuit connected to control the switch means, said bistable memory and control circuit including a bistable portion, one state of the bistable portion of the circuit acting to render conductive one of said paths and the other state of the bistable portion of the circuit acting to render conductive the other of said paths as alternate conditions of system operation, and a voltage control section that includes a plurality of field effect transistors, said system having a plurality of floating reference voltage means which derive reference voltages from said supply voltage means, one of the floating reference voltage means being connected to energize the bistable memory and control circuit and another of the floating reference voltage means being connected to energize the voltage control section.

51. An electric system that comprises a plurality of stages connected in cascade, each stage including, in combination, supply voltage means connected along two alternate paths to an electric terminal of the stage, switch means connected between the supply voltage means and the terminal and adapted to determine which side of the supply voltage means is connected to the terminal, control means connected to control said switch means, said switch means comprising a bilateral semiconductor switching circuit in one of said paths and a unilateral semiconducting switching circuit in the other of said paths, the switch means being operable to connect the supply voltage means of the plurality of stages in series and to bypass the supply voltage means of any stage of the plurality of stages.

52. An electric system as claimed in claim 51 in which the unilateral semiconducting switching circuit is a diode.

53. An electric system as claimed in claim 51 in which the bilateral switching circuit is a transistor and a diode, in combination.

54. An electric system that comprises a plurality of stages connected in cascade, each stage including, in combination, supply voltage means connected along two alternate paths to an electric terminal of the stage, switch means connected between the supply voltage means and the terminal and adapted to determine which side of the supply voltage means is connected to the terminal, control means connected to control said switch means, and floating reference voltage means which derives a reference voltage from the supply voltage means connected to energize the control means, said switch means comprising a transistor semiconductor switching circuit in one of said paths and a diode semiconducting switching circuit in the other of said paths.

55. A system as claimed in claim 54 in which the control means is a bistable memory and control circuit.

56. A system as claimed in claim 55 in which the bistable memory and control circuit is light triggered.

57. A system as claimed in claim 56 in which the floating reference voltage means is part of the bistable memory and control circuit.

58. A system as claimed in claim 54 having means in one stage of the plurality of stages to activate the control means to effect switching of the switch means of said one stage, the remaining stages of the plurality of stages being triggered in an avalanche mode.

59. An N-stage electric system that comprises a plurality of stages connected in cascade, each stage comprising a first electrical terminal, a second electrical terminal and a third electrical terminal, supply voltage means connected between the first electrical terminal and the second electrical terminal, first bilateral semiconductor switch means connected in a first electrical path between the second electrical terminal and the third electrical terminal, second bilateral semiconductor switch means connected in a second electrical path between the first electrical terminal and the third electrical terminal, and means to control the conductive state of the first bilateral semiconductor switch means and the second bilateral semiconductor switch means to render conductive the first electrical path and the second electrical path in a determined pattern to connect either one side or the other side of the supply voltage means to the third electrical terminal as alternate conditions of stage operation.

60. An electric system as claimed in claim 59 in which the supply voltage means in each stage is a battery.

61. An electric system as claimed in claim 59 in which the supply voltage means in each stage comprise solar cells.

62. An electric system as claimed in claim 59 in which the supply voltage means in each stage, except the first stage, is a capacitor, the first stage being connected to a primary source of electrical energy to supply power to the system.

63. An electric system as claimed in claim 62 in which the third electrical terminal of the first stage is connected to the first electrical terminal of the second stage, in which the third electrical terminal of the second stage is connected to the first electrical terminal of the third stage, and so forth to the N-th stage.

64. An electric system as claimed in claim 63 that includes a diode between each stage and the next succeeding stage, the diodes being directly connected between the second terminal of one stage and the second terminal of the next succeeding stage and being connected to carry electric current from said one stage to said next succeeding stage.

65. An electric system as claimed in claim 64 that includes means to trigger the stages in an avalanche mode.

66. An electric system as claimed in claim 64 in which said means to control in each stage is a light actuated memory connected to determine the state of conduction of the first semiconductor switch means and the second semiconductor switch means.

67. An electric system that comprises a plurality of stages connected in cascade, each stage comprising: an electrical power port, supply voltage means, first bilateral switch means connected in a first electrical path between one side of the supply voltage means and the electrical power port, second bilateral switch means connected in a second electrical path between the other side of the supply voltage means and the electrical power port; and means to control the conductive state of the first bilateral switch means and the second bilateral switch means to render conductive the first electrical path and the second electrical path in a determined pattern to establish the electrical power port at one polarity and to reverse the polarity depending upon which electrical path is conductive.

68. The system as claimed in claim 67, further comprising a primary source of electric energy connected to supply power to the system, said means to control acting to switch the first bilateral switch means and the second bilateral switch means to permit as conditions of system operation the transfer of electric energy from the primary source of electric energy to the supply voltage means and the transfer of electric energy from the supply voltage means to a load.

\* \* \* \* \*